(12) United States Patent
Oochi et al.

(10) Patent No.: US 6,287,701 B1
(45) Date of Patent: Sep. 11, 2001

(54) RESIN COMPOSITIONS, PROCESSES FOR THEIR PRODUCTION AND THEIR USES

(75) Inventors: Ikurou Oochi; Daisuke Miki, both of Osaka; Seiichirou Tanaka; Takeshi Sawai, both of Fukuoka, all of (JP)

(73) Assignee: Chuo Rika Kogyo Corporation, Osaka (JP)

( * ) Notice: Subject to any disclaimer, the term of this patent is extended or adjusted under 35 U.S.C. 154(b) by 0 days.

(21) Appl. No.: 09/317,196

(22) Filed: May 24, 1999

(30) Foreign Application Priority Data

May 25, 1998 (JP) .................................................. 10-142520
Feb. 18, 1999 (JP) .................................................. 11-039687

(51) Int. Cl.$^7$ ................................. B32B 9/04; C01B 33/14
(52) U.S. Cl. ........................... 428/447; 428/447; 524/588; 525/474; 525/476; 528/41; 427/387
(58) Field of Search ................................ 428/447; 427/387; 528/33, 41; 523/212; 524/442, 588; 525/474, 476

(56) References Cited

U.S. PATENT DOCUMENTS

| | | | |
|---|---|---|---|
| 3,186,963 | * | 6/1965 | Lewis et al. . |
| 4,171,406 | * | 10/1979 | Yamaguchi et al. . |
| 4,343,857 | * | 8/1982 | Uram, Jr. . |
| 4,368,235 | * | 1/1983 | Vughn, Jr. . |
| 4,456,647 | * | 6/1984 | Schonfelder et al. . |
| 4,559,385 | * | 12/1985 | Huhn et al. . |
| 5,049,636 | * | 9/1991 | Wolfgruber et al. . |
| 5,359,022 | * | 10/1994 | Mautner et al. . |
| 5,952,953 | * | 9/1999 | Nikawa et al. . |
| 6,025,077 | * | 2/2000 | Yamaki et al. . |
| 6,057,386 | * | 5/2000 | Morita et al. . |
| 6,077,966 | * | 6/2000 | Matsumara . |

* cited by examiner

Primary Examiner—Harold Pyon
Assistant Examiner—Elena Tsoy
(74) Attorney, Agent, or Firm—Oblon, Spivak, McClelland, Maier & Neustadt, P.C.

(57) ABSTRACT

A resin composition comprising the following components (1) and (2):

(1) a water-soluble resin having siloxane bonds, and
(2) a siloxane compound represented by the formula (A1):

$$SiO_a X_b Y_c \quad (A1)$$

wherein X is a hydrolyzable group, Y is a non-hydrolyzable group, $0 \leq a \leq 1.4$, and $b/(b+c)=0.01$ to 1.0, provided $2a+b+c=4$.

17 Claims, No Drawings

RESIN COMPOSITIONS, PROCESSES FOR THEIR PRODUCTION AND THEIR USES

BACKGROUND OF THE INVENTION

1. Field of the Invention

The present invention relates to resin compositions, processes for their production, their uses, and their coated products.

2. Discussion of Background

In recent years, attention has been drawn to a resin composition comprising an organic silicon compound and various types of polymer including an acrylic resin, as a material having merits of both organic and inorganic natures. The resin composition comprising these components usually employs one or more organic solvents such as higher alcohols, ketones, esters or aromatic substances, in a substantial amount in order to attain compatibility among the components, storage stability of the liquid or good physical properties of the coating film thereby formed.

These organic solvents are likely to evaporate during coating and thus create a problem from the viewpoint of global environmental protection. Accordingly, there have been worldwide movements to restrict their uses. Especially when coating is applied to a metal, cement or various ceramic base materials, treatment at a relatively high temperature is required, whereby evaporation of solvents is likely to bring about a danger of inflammation, which adds to the problem. Accordingly, it is desired to develop a resin composition containing an organic silicon compound which employs an aqueous solvent and which contains at least 10 wt % of water. However, when an aqueous solvent is employed, the organic silicon compound is poor in compatibility with water in addition to inadequate affinity between the organic silicon compound and the organic polymer in a curable composition. Accordingly, the presence of an organic solvent in the aqueous solvent has been required, and it has been impossible to exclude an organic solvent. Further, the resin composition employing an aqueous solvent may sometimes undergo solidification during storage, and it has been difficult to practically use it.

As a method for producing a stable aqueous resin, JP-A-10-36514 discloses a technique wherein a polymer containing both hydrolyzable silyl groups and acid groups and a silicon compound having hydroxyl groups or hydrolyzable silyl groups, are subjected to a condensation reaction, followed by neutralization with a basic compound for stabilization. However, the physical properties of the coating film thereby obtainable, are not fully satisfactory, and further, depending upon the type of the silicon compound used, gelation is likely to result, and it has been difficult to obtain a stable liquid composition, or film forming has been difficult.

SUMMARY OF THE INVENTION

Under these circumstances, the present inventors have conducted extensive studies on the above problems and as a result, have found it possible to solve the problems with a resin composition obtained by blending a specific siloxane compound and a specific water-soluble resin, or with a resin composition obtained by blending a specific siloxane compound and a specific water-dispersible resin. The present invention has been accomplished on the basis of this discovery. Further, it has been found that as the water-soluble resin or the water-dispersible resin, one having the pH adjusted to a certain level, is particularly preferred.

According to a first aspect, the present invention provides:

1. A resin composition comprising the following components (1) and (2):
   (1) a water-soluble resin having siloxane bonds, and
   (2) a siloxane compound represented by the formula (A1):

$$SiO_aX_bY_c \qquad (A1)$$

wherein X is a hydrolyzable group, Y is a non-hydrolyzable group, $0 \leq a \leq 1.4$, and $b/(b+c)=0.01$ to 1.0, provided $2a+b+c=4$.

2. The resin composition according to Item 1, wherein the component (1) is a water-soluble resin having a pH of from 2 to 11.
3. The resin composition according to Item 1, wherein the component (1) is a water-soluble resin obtained by neutralizing a resin having carboxyl groups.
4. The resin composition according to Item 1, wherein the component (1) is a water-soluble resin composed of a resin having hydroxyl groups.
5. The resin composition according to Item 1, wherein the component (1) is a water-soluble resin obtained by neutralizing a resin having sulfonic groups.
6. The resin composition according to Item 1, wherein in the siloxane compound of the component (2), $c=0$.
7. A resin composition comprising a siloxane component represented by the formula (B1):

$$SiO_{a'}X_{b'}Y_{c'} \qquad (B1)$$

wherein X is a hydrolyzable group, Y is a non-hydrolyzable group, $1.4<a'<2$, and $b'/(b'+c')=0.01$ to 1.0, provided $2a'+b'+c'=4$.

8. The resin composition according to Item 7, wherein the siloxane component is in the form of particulates having an inertia radius of from 20 Å to 200 Å as measured by a small angle X-ray scattering method.
9. A coating composition comprising the resin composition as defined in Item 1 and a pigment and/or a powder dispersed in the resin composition.
10. A curable resin composition comprising the resin composition as defined in Item 1 and an epoxy resin, a polyisocyanate resin, a melamine resin or a resin having aziridine rings, oxazoline rings or carbodiimide groups, blended thereto.
11. A method for producing a resin composition, which comprises blending and aging the following components (1) and (2) within a pH of from 2 to 11 at a temperature of from 0 to 200° C.:
    (1) a water-soluble resin having siloxane bonds, and
    (2) a siloxane compound represented by the formula (A1):

$$SiO_aX_bY_c \qquad (A1)$$

wherein X is a hydrolyzable group, Y is a non-hydrolyzable group, $0 \leq a \leq 1.4$, and $b/(b+c)=0.01$ to 1.0, provided $2a+b+c=4$.

12. The method for producing a resin composition according to item 11, wherein an organic solvent is present at the time of blending the components (1) and (2), and the blending and aging are carried out within a temperature range of from 0 to 200° C.

According to a second aspect, the present invention provides:

13. A resin composition comprising the following components (1') and (2'):
    (1') a water-dispersible resin having hydrolyzable silyl groups, and (2') a siloxane compound represented by the formula (A2):

$$SiO_aX_b \quad (A2)$$

wherein X is a hydrolyzable group, $0 \leq a \leq 1.4$, and b=1.2 to 4.0, provided 2a+b=4.

14. The resin composition according to Item 13, wherein the component (1') is a water-dispersible resin having a pH of from 6 to 12.

15. The resin composition according to Item 13, wherein the component (1') is a water-dispersible resin obtained by neutralizing a resin having carboxyl groups.

16. The resin composition according to Item 13, wherein the component (1') is a water-dispersible resin composed of a resin having hydroxyl groups.

17. The resin composition according to Item 13, wherein the component (1') is a water-dispersible resin obtained by neutralizing a resin having sulfonic groups.

18. A resin composition comprising a siloxane component represented by the formula (B2):

$$SiO_{a'}X_{b'} \quad (B2)$$

wherein X is a hydrolyzable group, $1.4 < a' < 2$, provided 2a'+b'=4.

19. A coating composition comprising the resin composition as defined in Item 13 and a powder dispersed in the resin composition.

20. A curable resin composition comprising the resin composition as defined in Item 13 and at least one member selected from the group consisting of an epoxy resin, a polyisocyanate resin, a melamine resin and a resin having at least one type of rings selected from the group consisting of aziridine rings, oxazoline rings and carbodiimide groups, blended thereto 21. A method for producing a resin composition, which comprises blending and aging the following components (1') and (2') within a pH of from 6 to 12 at a temperature of from 0 to 200° C.:

(1') a water-dispersible resin having hydrolyzable silyl groups, and (2') a siloxane compound represented by the formula (A2):

$$SiO_aX_b \quad (A2)$$

wherein X is a hydrolyzable group, and $0 \leq a \leq 1.4$, provided 2a+b=4.

22. The method for producing a resin composition according to Item 21, wherein an organic solvent is present at the time of blending the components (1') and (2'), and the blending and aging are carried out within a temperature range of from 0 to 200° C.

23. A coated product obtained by coating the coating composition as defined in Item 9.

24. A coated product obtained by coating the coating composition as defined in Item 19.

It has been found that the coating films obtained by coating and curing the above resin compositions or the coating compositions, present coating films excellent in solvent resistance, chemical resistance and weather resistance.

DETAILED DESCRIPTION OF THE PREFERRED EMBODIMENT

Now, the first aspect of the present invention will be described in detail.

(1) Water-soluble Resin Having Siloxane Bonds

The water-soluble resin having siloxane bonds, which can be used in the present invention, is a resin having siloxane bonds (represented by $(Si-O)_n$) and is not particularly limited so long as it is "soluble in water". "Soluble in water" is meant for a resin capable of being uniformly dissolved to present a colorless transparent appearance when the resin component is mixed with water. It may be used in the form of a water-soluble synthetic resin or an aqueous synthetic resin emulsion, and it includes a synthetic resin aqueous solution, a synthetic resin aqueous dispersion and one so-called an aqueous dispersion or latex, so long as it is uniform and transparent on appearance.

The type of the resin used as the resin component of the water-soluble synthetic resin is not particularly limited so long as it is a water-soluble resin, and the following may, for example, be mentioned.

A resin such as a radical polymerization resin or an ion polymerization resin, may be employed, such as an acrylic resin, an acryl/styrene copolymer resin, a vinyl acetate resin, a vinyl acetate/acrylic copolymer resin, a vinyl acetate partially saponified vinyl alcohol resin, a vinyl alcohol resin, an ethylene/vinyl acetate copolymer resin, an olefinic resin, a vinyl chloride resin, a vinylidene chloride resin, a vinyl chloride/acrylic copolymer resin or a styrene/butadiene copolymer resin. Further, a condensed resin such as a urethane resin, a polyester resin, a nylon resin, a phenoxy resin or an epoxy resin, may also be employed.

The water-soluble resin having siloxane bonds can be obtained by subjecting a resin having hydrolyzable silyl groups to hydrolytic condensation in an aqueous system or in a solvent system.

The hydrolyzable silyl groups prior to the hydrolysis may be of any form, and any resin may be used so long as it is a water-soluble synthetic resin having siloxane bonds, which is obtainable by preliminarily hydrolyzing and condensing a polymer having alkoxysilyl groups, acetoxysilyl groups, oximesilyl groups or amidesilyl groups, represented by the following formula (C):

$$—Si(Rf)_n(Rg)_{(3-n)} \quad (C)$$

wherein n is an integer of 1, 2 or 3, and Rf is:

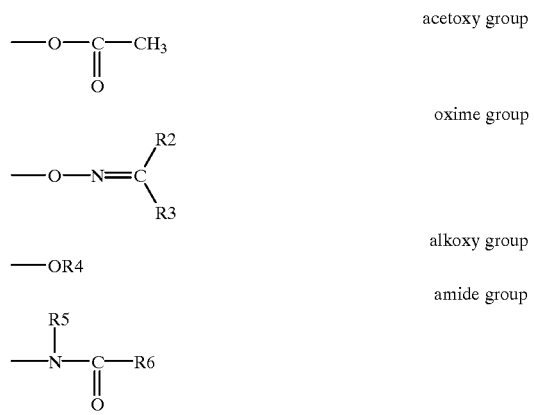

wherein each of R2 to R6 is a $C_{1-8}$ hydrocarbon group or a phenyl group and Rg is a $C_{1-8}$ hydrocarbon group or a phenyl group.

As a method for synthesis of such a water-soluble resin or a method for water-solubilization, the following conventional methods may be mentioned.

Water-solubilization

1) An Aqueous Solution Polymerization Method

A method wherein a water-soluble resin is obtained by radical polymerization (inclusive of solution polymerization and emulsion polymerization) of a radical-polymerizable monomer in an aqueous medium or in a mixture of an aqueous medium with a hydrophilic solvent.

2) A Post Water-solubilization Method

A method wherein a water-soluble resin is obtained by adding and dissolving a water-soluble polymer containing a large amount of hydrophilic functional groups obtained by radical polymerization or condensation reaction, in water.

Which one of the above methods is employed to obtain a water-soluble synthetic resin, varies depending upon the type of the synthetic resin. For example, an acrylic resin or an acrylic styrene copolymer resin may be produced by emulsion polymerization, solution polymerization or aqueous solution polymerization.

Among them, a water-soluble resin of acrylic resin (inclusive of an acrylic styrene copolymer resin) or a water-soluble resin of urethane resin, is preferred from the viewpoint of the physical properties of the coating film thereby formed.

A method for introducing siloxane bonds in order to obtain blend stability and desired physical properties, may, for example, be a method wherein a radical double-bonding alkoxysilane, acetoxysilane, oximesilane or amidesilane having a hydrolyzable silyl group, or a mercapto alkoxysilane, mercapto actoxysilane, mercapto oximesilane or mercapto amidesilane having a chain transfer effect, is copolymerized during the radical polymerization, followed by hydrolytic condensation, a method wherein a polyolefinic resin and th e above-mentioned radical-double bonding silane, are grafted in the presence of a radical initiator, followed by hydrolytic condensation, or a method wherein an aminealkoxysilane, an amineoximesilane, an amineamidesilane, an amineacetoxysilane, a glycidylalkoxysilane, a glycidylacetoxysilane, a glycidyloximesilane, a glycidylamidesilane, an isocyanatealkoxysilane, an isocyanateacetoxysilane, an isocyanateoximesilane, an isocyanateamidesilane, a chloroalkoxysilane, a chloroacetoxysilane, a chlorooximesilane or a chloroamidesilane, having a reactivity with a polyfunctional group, or an alkoxysilane, an acetoxysilane, an oximesilane or an amidesilane, having a carboxyl group, is used during or after polymerization of the resin to bond it to the resin, followed by hydrolytic condensation or a method wherein such a silane is reacted and bonded after preparation of the resin, followed by hydrolytic condensation.

For example, glycidyl groups are introduced to a resin, and an aminosilane is reacted and imparted thereto, or a glycidylsilane is reacted and imparted to carboxyl groups of a resin, followed by hydrolytic condensation in the presence of water, to obtain a stable water-soluble resin having siloxane bonds and having partially remained hydrolyzable silyl groups and/or silanol groups.

The amount of the above-mentioned hydrolyzable silyl groups introduced is preferably such that alkoxysilanes, acetoxysilanes, oximesilanes or amidesilanes are used within a range of from 0.1 to 70 parts by weight, more preferably from 1 to 30 parts by weight, per 100 parts by weight of the total amount of resin monomers.

If the alkoxy group-containing silanes, the acetoxy group-containing silanes, the oxime group-containing silanes or the amide group-containing silanes to be introduced into the resin, are less than 0.1 part by weight per 100 parts by weight of the total amount of the resin monomers, the storage stability of a water-soluble resin composition obtained by incorporating the siloxane compound which is described hereinafter, tends to be poor, and the properties of the coating film such as the hardness, chemical resistance and weather resistance, tend to be hardly obtainable. On the other hand, if they exceed 70 parts by weight per 100 parts by weight of the total amount of the resin monomers, the water-soluble resin itself is likely to be gelled, whereby a stable polymer can hardly be obtainable.

These will now be described in detail.

Water-soluble Resin Having Siloxane Bonds, Prepared by an Emulsion Polymerization Method The water-soluble resin having siloxane bonds, can be produced by a conventional emulsion polymerization method.

As the monomer components to be used for polymerization, it is possible to selectively use at least one member among acrylates, methacrylates, styrene or its derivatives, acrylonitrile, vinyl acetate and other vinyl monomers, and diene monomers such as butadiene, chloroprene and isoprene, and as an essential component, a radical double bonding monomer having a hydrolyzable silyl group or a mercaptosilane having a hydrolyzable silyl group, or a hydrolyzable silane having a reactive glycidyl group.

Specific examples of the methacrylates include methyl methacrylate, ethyl methacrylate, n-butyl methacrylate, t-butyl methacrylate, i-butyl methacrylate and 2-ethylhexyl methacrylate.

Specific examples of the acrylates include methyl acrylate, ethyl acrylate, n-butyl acrylate, i-butyl acrylate, 2-ethylhexyl acrylate and octyl acrylate. These methacrylates and acrylates are usually used alone or in combination as a mixture of two or more of them.

Examples of the above-mentioned styrene derivatives include styrene, α-methylstyrene and vinyltoluene.

Other vinyl monomers include, for example, (meth)acrylonitrile, (meth)acrylamide, N-methylol(meth)acrylamide, 2-hydroxyethyl (meth)acrylate, glycidyl (meth)acrylate, N,N-dimethylaminoethyl acrylate, N,N-diethylaminoethyl acrylate, methoxyethyl (meth)acrylate, butoxyethyl (meth)acrylate, vinyl acetate, vinyl propionate, vinyl versatate and vinyl chloride.

Specific examples of the alkoxysilanes, acetoxysilanes, oximesilanes and amidesilanes, having hydrolyzable silyl groups, include alkoxysilyl group-containing unsaturated monomers such as vinyl trimethoxysilane, vinyl triethoxysilane, methylvinyl dimethoxysilane, dimethylvinyl methoxysilane, dimethylvinyl ethoxysilane, methylvinyl diethoxysilane, vinyl tris(methoxyethoxy)silane, vinyl triacetoxysilane, methylvinyl diacetoxysilane, dimethylvinyl acetoxysilane, 3-methacryloxypropyl trimethoxysilane, 3-methacryloxypropylmethyl dimethoxysilane, 3-methacryloxypropyl dimethylmethoxysilane, 3-methacryloxypropyl triethoxysilane, 3-methacryloxypropylmethyl diethoxysilane, 3-methacryloxypropyl dimethylethoxysilane and 3-methacryloxypropyl trioximesilane.

The hydrolyzable silyl group-containing monomers having chain transfer effects, include, for example, 3-mercaptopropyl trimethoxysilane, 3-mercaptopropyl triethoxysilane, 3-mercaptopropylmethyl dimethoxysilane, 3-mercaptopropylmethyl diethoxysilane, 3-mercaptopropyl dimethylmethoxysilane, 3-mercaptopropyl dimethylethoxysilane, 3-mercaptopropyl triacetoxysilane, 3-mercaptopropylmethyl diacetoxysilane, 3-mercaptopropyl dimethylacetoxysilane and 3-mercaptopropyl trioximesilane.

Further, the aminoalkoxysilanes and aminoacetoxysilanes reactive with various functional groups include, for example, N-(2-aminoethyl)-3-aminopropyl trimethoxysilane, N-(2-aminoethyl)-3-aminopropyl triethoxysilane, N-(2-aminoethyl)-3-aminopropylmethyl dimethoxysilane, N-(2-aminoethyl)-3-aminopropylmethyl diethoxysilane, N-(2-aminoethyl)-3-aminopropyl dimethylmethoxysilane, N-(2-aminoethyl)-3-propyl dimethylethoxysilane and N-(2-aminoethyl)-3-aminopropyl triacetoxysilane.

Further, the alkoxysilanes and acetoxysilanes having glycidyl groups, include, for example, 3-glycidoxypropyl trimethoxysilane, 3-glycidoxypropyl triethoxysilane, 3-glycidoxypropylmethyl dimethoxysilane, 3-glycidoxypropyl dimethylmethoxysilane, 3-glycidoxypropyl dimethylethoxysilane and 3-glycidoxypropyl triacetoxysilane.

The alkoxysilanes and acetoxysilanes having chlorine, include, for example, 3-chloropropyl trimethoxysilane, 3-chloropropyl triethoxysilane, 3-chloropropylmethyl dimethoxysilane, 3-chloropropylmethyl diethoxysilane, 3-chloropropyl dimethylmethoxysilane, 3-chloropropyl dimethylethoxysilane and 3-chloropropyl triacetoxysilane.

Other than these silanes having hydrolyzable silyl groups, oxime silanes or amide silanes may also be used.

These silanes having hydrolyzable silyl groups may be represented by the following formula (D), and they may be used alone or in combination as a mixture of two or more of them.

wherein m is an integer of 1, 2 or 3, n is an integer of 1, 2 or 3, X is:

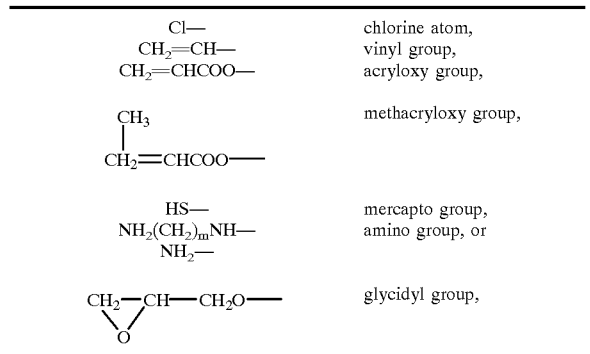

| | |
|---|---|
| Cl— | chlorine atom, |
| CH$_2$=CH— | vinyl group, |
| CH$_2$=CHCOO— | acryloxy group, |
| CH$_3$<br>\|<br>CH$_2$=CHCOO— | methacryloxy group, |
| HS—<br>NH$_2$(CH$_2$)$_m$NH—<br>NH$_2$— | mercapto group,<br>amino group, or |
| CH$_2$—CH—CH$_2$O—<br>\\ /<br>O | glycidyl group, |

Rf is:

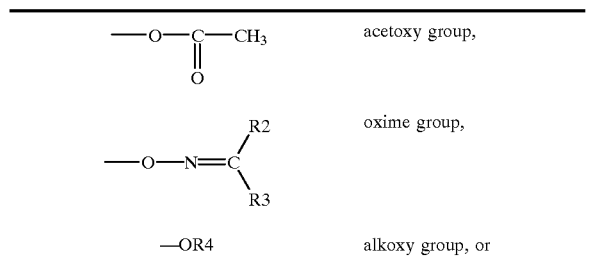

| | |
|---|---|
| —O—C—CH$_3$<br>\|\|<br>O | acetoxy group, |
| —O—N=C$\begin{smallmatrix}R2\\R3\end{smallmatrix}$ | oxime group, |
| —OR4 | alkoxy group, or |

amide group, wherein each of R2 to R6 is a C$_{1-8}$ hydrocarbon group or a phenyl group, and Rg is a C$_{1-8}$ hydrocarbon group or a phenyl group.

When these monomers are subjected to emulsion polymerization, it will be necessary to copolymerize a radical polymerizable monomer having a hydrophilic nature in order to stabilize the formed emulsion particles during the polymerization and to make them water-soluble.

The radical polymerizable monomer having a hydrophilic nature may be anionic, cationic, nonionic or amphoteric.

As an anionic monomer having a carboxyl group in its molecule, maleic acid, fumaric acid, crotonic acid, itaconic acid, acrylic acid, or methacrylic acid, may, for example, be mentioned.

Likewise, as a monomer having a sulfonic group in its molecule, vinylsulfonic acid, (meth)allylsulfonic acid, styrenesulfonic acid, (meth)acrylic acid-2-ethylsulfonic acid, or acrylamide-2-methylpropanesulfonic acid, may, for example, be mentioned.

Likewise, as a monomer having a phosphoric acid group in its molecule, (meth)acrylic acid-2-hydroxyethylphosphoric acid ester may, for example, be mentioned.

Such an anionic monomer may be used also as a salt with an organic amine such as ammonia, triethylamine or monoethanolamine or with an alkali metal such as sodium or potassium.

Examples of the cationic monomer include dimethylaminomethyl (meth)acrylate, diethylaminoethyl (meth)acrylate, dimethylaminoethyl (meth)acrylate, dimethylaminopropyl (meth)acrylate, methacrylamidepropyltrimethylammonium chloride, methacrylic acid-2-hydroxypropyltrimethylammonium chloride, diallyldimethylammonium chloride and p-vinylbenzylammonium chloride.

Examples of the nonionic monomer include (meth) acrylamide, N-methylol(meth)acrylamide, N,N-dimethyl (meth)acrylamide, acryloylmorpholin, diacetoneacrylamide, vinylpyrrolidone, vinyloxazolidone, hydroxyethyl (meth) acrylate and hydroxypropyl (meth)acrylate.

Among these radical polymerizable monomers having hydrophilic groups, an anionic monomer or a cationic monomer is preferred from the viewpoint of the stability in the pH range. If a nonionic monomer is introduced in an amount required to stabilize the emulsion, there will be a problem from the viewpoint of water resistance of the coating film.

With respect to the amount of such a hydrophilic monomer, if it is too small, the stability during the emulsion polymerization tends to deteriorate, and it will be impossible to make the polymer water-soluble at the time of neutralization. If it is too much, water resistance of the dried coating film tends to be poor. Therefore, it is used within a range of from 5 to 50 parts by weight, preferably from 10 to 30 parts by weight, per 100 parts by weight of the total amount of the polymerizable monomers.

The emulsion polymerization reaction is carried out in an aqueous medium in the presence of an emulsifier with stirring at a predetermined temperature by supplying the monomers and the polymerization initiator all at once or continuously.

The amount of the emulsifier is usually within a range of from 0.05 to 10 parts by weight, preferably from 0.1 to 5 parts by weight, per 100 parts by weight of the total amount of the polymerizable monomers. Specific examples of the emulsifier include a cationic emulsifier such as stearylamine hydrochloride, lauryltrimethylammonium chloride or trimethyloctadodecylammonium chloride, an anionic emulsifier such as potassium oleate, sodium laurylsulfate, sodium dodecylbenzene sulfonate, sodium alkanesulfonate, sodium alkylnaphthalenesulfonate, sodium dialkylsulfosuccinate, sodium polyoxyethylenealkylether sulfate, sodium polyoxyethylenealkylallylether sulfate or polyoxyethylenealkylether phosphate or polyoxyethylenealkylallylether phosphate, a nonionic emulsifier such as polyoxyethylenealkylether, polyoxyethylenealkylallylether, polyoxyethyleneoxypropylene block polymer, polyethylene glycol fatty acid ester or polyoxyethylene sorbitan fatty acid ester, and an amphoteric emulsifier such as laurylbetaine or lauryldimethylamine oxide.

Further, an emulsifier which is commercially available as a so-called reactive emulsifier and which has a polymerizable double bond in its molecular structure, may also be employed.

The amount of the reactive emulsifier is usually at most 10 parts by weight, preferably at most 8 parts by weight, more preferably at most 5 parts by weight, per 100 parts by weight of the total amount of the polymerizable monomers. Examples of the reactive emulsifier include "ADEKARIA SOAP SE-10N", manufactured by Asahi Denka Kogyo K.K., "LATEMURU S-1800", manufactured by Kao Corporation, "ELEMINOL JS-2", manufactured by Sanyo Kasei Kogyo K.K., "AKUARON HS-10", manufactured by Daiichi Kogyo Seiyaku Co., Ltd. and "ANTOX MS-60", manufactured by Nippon Nukazai K.K.

Further, a chain transfer agent such as various mercaptans, α-methylstyrene or an alkyl halide, may be employed as the case requires. Such a chain transfer agent is employed mainly for the purpose of adjusting the molecular weight of the polymer to improve the water solubility. Its amount is usually from 0.01 to 10 parts by weight per 100 parts by weight of the total amount of the polymerizable monomers. If it is less than 0.01 part by weight, no adequate effects for lowering the molecular weight will be obtained, and if it exceeds 10 parts by weight, it is likely to inhibit the polymerization thus leading to a problem in the polymerizability.

Further, a water-soluble polymer such as polyvinyl alcohol or hydroxylethyl cellulose, a water-soluble acrylic copolymer or a copolymer of sodium styrenesulfonate may be used alone or in combination with the above-mentioned emulsifier.

The monomer concentration during the polymerization is usually from 30 to 70 wt %, preferably from 35 to 65 wt % in the total amount. As the polymerization initiator, a radical polymerization initiator which is commonly used, for example, a persulfate such as ammonium persulfate or potassium persulfate, an azo type polymerization initiator such as 2,2'-azobisisobutyronitrile or 2,2'-(2,4-dimethylvaleronitrile), or a peroxide type polymerization initiator such as benzoyl peroxide or lauryl peroxide, may, for example, be mentioned.

The amount of the radical polymerization initiator is usually from 0.2 to 10 parts by weight, preferably from 0.3 to 5 parts by weight, per 100 parts by weight of the total amount of the polymerizable monomers. The reaction time for the polymerization is usually from 2 to 16 hours, and the temperature during the polymerization is usually from 60 to 100° C.

The neutralization step is carried out usually at a temperature of from 0 to 90° C., and it is possible to shorten the time for water-solubilization by increasing the temperature. This step will not be required when a nonionic monomer is used.

In this neutralization step, introduced alkoxysilyl groups are hydrolyzed and condensed, whereby a water-soluble resin having partial siloxane bonds can simultaneously be obtained.

The degree of neutralization is such that, for example, in the case of a carboxyl group-containing water-soluble resin, at least 20 mol % of carboxyl groups may be neutralized, and preferably, at least 30 mol %, more preferably at least 80 mol % may be neutralized.

As the neutralizing agent to be used for the neutralization, in the case of an anionic monomer, a basic compound such as ammonia or an organic amine may be used. Specific examples of the organic amine include an alkylamine such as monomethylamine, diethylamine or triethylamine, an alkanolamine such as monoethanolamine, diethanolamine, triethanolamine, dimethylaminoethanol or diethylaminoethanol, morpholine, pyridine and piperazine.

Further, an inorganic water-soluble alkali may also be used, and it may, for example, be sodium hydroxide, potassium hydroxide, sodium hydrogencarbonate or pyrophosphoric acid.

In the case of a cationic monomer, water-solubilization can be carried out by neutralizing amino groups with an inorganic acid or an organic acid. The degree of neutralization may be such that, for example, in the case of an amino group-containing water-soluble resin, at least 20 mol % of amino groups may be neutralized, and preferably, at least 30 mol %, more preferably at least 80 mol %, may be neutralized. As a neutralizing agent to be used here, an organic acid such as formic acid, acetic acid, propionic acid, succinic acid, citric acid or malic acid, or an inorganic acid such as hydrochloric acid, phosphoric acid, sulfuric acid or nitric acid, may, for example, be used.

A nonionic monomer is a monomer capable of water-solubilizing the resin without neutralization, and the amount required for water solubilization is usually from 7 to 50 parts by weight, preferably from 15 to 50 parts by weight, per 100 parts by weight of the total amount of the polymerizable monomers.

The weight average molecular weight of the water-soluble resin having siloxane bonds, obtainable by the emulsion polymerization method, is usually from 500 to 500,000, preferably from 1,000 to 100,000.

Water-soluble Synthetic Resin Having Siloxane Bonds, Prepared by a Solution Polymerization Method When a solution polymerization method is employed, it is preferred to carry out the polymerization in a water-soluble organic solvent taking into consideration the subsequent step of imparting water solubility or water dispersibility. Such a water-soluble organic solvent may, for example, be an alcohol such as methyl alcohol, ethyl alcohol, isopropyl alcohol, n-propyl alcohol or butyl alcohol, a ketone such as methyl ethyl ketone, or an ether such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether or propylene glycol monobutyl ether.

The polymerizable monomers to be used may be the same as the group of monomers described with respect to the above emulsion polymerization.

With respect to the constitution of monomers to impart water solubility subsequently, the monomer to impart anionic nature is required to be from 5 to 50 parts by weight, per 100 parts by weight of the total amount of the polymerizable monomers, the nonionic monomer is required to be from 7 to 50 parts by weight, and the cationic monomer is required to be from 5 to 50 parts by weight.

Especially when an unsaturated carboxylic acid is used among anionic monomers, its amount is usually from 5 to 50 parts by weight, preferably from 10 to 40 parts by weight, per 100 parts by weight of the total amount of the polymerizable monomers. If it is less than 5 parts by weight, the water-dispersibility and the water-solubility tend to be poor, and if it exceeds 50 parts by weight, the water resistance and alkali resistance of the coating film tend to be poor.

The degree of neutralization may be such that at least 20 mol % of carboxyl groups contained are neutralized, and preferably at least 30 mol %, more preferably at least 80 mol %, may be neutralized.

As a neutralizing agent to be used for the neutralization, in the case of an anionic monomer, a basic compound such as ammonia or an organic amine may be mentioned. Specific examples of the organic amine include an alkylamine such as monomethylamine, diethylamine or triethylamine, an alkanolamine such as monoethanolamine, diethanolamine, triethanolamine, dimethylaminoethanol or diethylaminoethanol, morpholine, pyridine and piperazine.

Further, an inorganic water-soluble alkali may also be used, and it may, for example, be sodium hydroxide, potassium hydroxide, sodium hydrogencarbonate or pyrophosphoric acid.

In the case of a cationic monomer, the water-solubilization can be carried out by neutralizing amino groups with an inorganic acid or an organic acid. The degree of neutralization may be such that, for example, in the case of an amino group-containing water-soluble resin, at least 20 mol % of amino groups are neutralized, and preferably at least 30 mol %, more preferably at least 80 mol % may be neutralized. The neutralizing agent to be used here may, for example, be an organic acid such as formic acid, acetic acid, propionic acid, succinic acid, citric acid or malic acid, or an inorganic acid such as hydrochloric acid, phosphoric acid, sulfuric acid or nitric acid.

The nonionic monomer is a monomer capable of water solubilizing the resin without neutralization, and its required amount for water-solubilization is usually from 7 to 50 parts by weight, preferably from 15 to 50 parts by weight, per 100 parts by weight of the total amount of the polymerizable monomers.

Further, a chain transfer agent such as various mercaptans, α-methylstyrene or an alkyl halide, may be employed as the case requires. Such a chain transfer agent is employed mainly for the purpose of adjusting the molecular weight of the polymer to improve the water solubility. Its amount is usually from 0.01 to 10 parts by weight, per 100 parts by weight of the total amount of the polymerizable monomers.

The polymerization method is such that a mixture comprising an alkoxysilyl group-containing monomer, other hydrophilic group-containing monomers and other ethylenically unsaturated monomers, is charged all at once or in a divided fashion to the above-mentioned hydrophilic solvent or water, or a mixture thereof, and the above-mentioned polymerization initiator is added to carry out radical polymerization. The concentration of monomers during the polymerization is from 30 to 70 wt %, preferably from 35 to 65 wt %, in their total amount, and the radical polymerization initiator is used in an amount of from 0.1 to 10 parts by weight, preferably from 0.3 to 5 parts by weight, per 100 parts by weight of the total amount of the polymerizable monomers. The reaction time is usually from 2 to 16 hours, and the reaction temperature during the polymerization is usually from 60 to 100° C.

The water-solubilization varies depending upon the type of the above-mentioned hydrophilic monomer. In the case of a polymerized resin of a cationic or anionic nature, the desired water-soluble resin having siloxane bonds can be obtained by adding water and a neutralizing agent capable of imparting water solubility.

The neutralization step is carried out usually at a temperature of from 0 to 90° C., and it is possible to shorten the time for water-solubilization by increasing the temperature. In the case of a nonionic monomer, such a step is not required.

The weight average molecular weight of the water-soluble resin having siloxane bonds, obtainable by the solution polymerization method, is usually from 500 to 500,000, preferably from 1,000 to 100,000.

(2) Siloxane Compound of the Formula (A1)

The siloxane compound to be used for the aqueous composition of the present invention is one represented by the formula (A1):

$$SiO_a X_b Y_c \qquad (A1)$$

wherein X is a hydrolyzable group, Y is a non-hydrolyzable group, $0 \leq a \leq 1.4$, $b/(b+c)=0.0$ to $1.0$, provided $2a+b+c=4$.

In the present invention, the siloxane compound to be blended with the above-mentioned water-soluble resin having siloxane bonds, may be any compound so long as it is a siloxane compound wherein $0 \leq a \leq 1.4$. The coefficient a is a coefficient representing the siloxane condensation degree of the siloxane compound, and the case where a=0, represents a monomer of the silicon compound having no siloxane bond, and the case where a>0, represents an oligomer having siloxane bonds.

The siloxane compound to be used in the present invention may be the monomer of the silicon compound and/or the oligomer. Such monomers and oligomers may be used alone or in combination as a mixture of two or more of them.

The formula (A1) is a rational formula for the siloxane compound which may be a single silicon compound or a mixture of such silicon compounds.

When a>1.4, the siloxane compound tends to have high viscosity and tends to be gelled, whereby the storage stability deteriorates, and it can hardly be useful. The case where a=2, represents silica ($SiO_2$) having no organic functional group such as X or Y. The silica wherein a=2, such as colloidal silica or fumed silica, is particulate silica having no organic functional group, and accordingly, when it is blended with the water-soluble resin used in the present invention to obtain a coating composition, the storage stability of the composition will be good, but the effect for improving the hardness, solvent resistance and chemical resistance when made into a coating film, can not be expected.

The range of coefficient a is usually $0 \leq a \leq 1.4$, preferably $0.5 \leq a \leq 1.4$, more preferably $0.6 \leq a \leq 1.2$, whereby when a water-soluble resin composition obtainable by blending and aging it with the water-soluble resin, is made into a coating or covering film, development of such functions as the high hardness, solvent resistance and chemical resistance, will be remarkable, such being most desirable.

X is a hydrolyzable group and is a group capable of forming a siloxane bond by e.g. a hydrolytic condensation reaction. Such a hydrolyzable group includes a halogen atom, a hydrogen atom, a hydroxyl group and an OR group, and is at least one member among them.

The halogen atom may, for example, be —F, —Cl, —Br or —I.

The OR group is at least one member among groups wherein R is an alkyl group, a cycloalkyl group, an alkoxyalkyl group, an aryl group, an aralkyl group or an alkylpolyoxyalkylenyl group. Typical examples of R will be shown below.

The alkyl group may, for example, be a methyl group, an ethyl group, a propyl group, a butyl group, a pentyl group, a hexyl group, a heptyl group, a 2-ethylhexyl group, an octyl group or a decyl group, and may be of straight chain or branched chain.

The cycloalkyl group may, for example, be a cyclohexyl group, a cyclobutyl group or a cyclopentyl group.

The alkoxyalkyl group may, for example, be a methoxyethyl group, an ethoxyethyl group or a butoxyethyl group.

The aryl group may, for example, be a phenyl group, a tolyl group or a xylyl group.

The aralkyl group may, for example, be a benzyl group or a phenethyl group.

The alkylpolyoxyalkylenyl group may, for example, be $CH_3—(OCH_2CH_2)_n—$, $C_2H_5—(OCH_2CH_2)_n—$, $CH_3—(OCH_2CHCH_3)_n—$ or $C_2H_5—(OCH_2CHCH_3)_n—$.

When X is a halogen atom, a hydrogen halide will be produced as a byproduct by the hydrolysis, and when it is a hydroxyl group, hydrogen will be formed as a byproduct. Therefore, it is necessary to take a due care for inflammability, corrosiveness and toxicity of these byproducts. For this reason, X is preferably the OR group, and taking into consideration the reaction with the aqueous resin and efficiency for forming a siloxane bond by the hydrolytic condensation of the siloxane compound itself, R is preferably selected from at least one member among a methyl group, an ethyl group, a propyl group and a butyl group, whereby high cross-linking is attainable in the process for forming a coating or covering film from a water-soluble resin composition obtained by blending and aging the siloxane compound with the water-soluble resin, and development of functions such as high hardness, solvent resistance and chemical resistance will be most remarkable with the resulting coating film.

Y is a non-hydrolyzable group and is at least one group selected from an alkyl group, a cycloalkyl group, an alkoxyalkyl group, an alkenyl group, an aryl group, an aralkyl group, an alkylpolyoxyalkylenyl group, an acryl group, an acyloxyalkyl group and a glycidyloxyalkyl group. Typical examples of Y will be shown below.

The alkyl group may, for example, be a methyl group, an ethyl group, a propyl group, a butyl group, a pentyl group, a hexyl group, a heptyl group, a 2-ethylhexyl group, an octyl group or a decyl group and may be of straight chain or branched chain.

The cycloalkyl group may, for example, be a cyclohexyl group, a cyclobutyl group or a cyclopentyl group.

The alkoxyalkyl group may, for example, be a methoxyethyl group, an ethoxyethyl group or a butoxyethyl group.

The alkenyl group may, for example, be a vinyl group, a 1-propenyl group, a 2-propenyl group, a 1-butenyl group or a 2-butenyl group.

The aryl group may, for example, be a phenyl group, a tolyl group or a xylyl group.

The aralkyl group may, for example, be a benzyl group or a phenethyl group.

The alkylpolyoxyalkylenyl group may, for example, be $CH3—(OCH_2CH_2)_n$, $C_2H5—(OCH_2CH_2)_n—$, $CH_3—(OCH_2CHCH_3)_n—$ or $C_2H_5—(OCH_2CHCH_3)_n—$.

The acyl group may, for example, be an acetyl group or a propionyl group.

The acyloxyalkyl group may, for example, be an acryloyloxypropyl group or a methacryloyloxypropyl group.

The glycidyloxyalkyl group may, for example, be a glycidyloxypropyl group. Further, as an epoxy ring-containing group, a β-(3,4-epoxycyclohexyl)ethyl group may, for example, be mentioned.

Y contributes to improvement in the storage stability of the water-soluble resin composition obtainable by blending with the water-soluble resin followed by aging and to improvement in the flexibility of the coating film, and it also has an effect for improving the compatibility with the water-soluble resin. In view of these characteristics, Y can be selected within a wide range.

Selection of X and Y in the siloxane compound to be used for the water-soluble resin composition of the present invention, can be optionally made depending upon the purpose of the water-soluble resin composition. Namely, the selection may be made taking into consideration the compatibility with the water-soluble resin component in the water-soluble resin composition of the present invention, and the storage stability, as well as development of such functions as high hardness, flexibility, solvent resistance and chemical resistance with the obtainable coating film.

The ratio of X to Y is represented by b/(b+c) which is within a molar ratio of from 0.01 to 1.0, preferably within a molar ratio of from 0.1 to 1.0, more preferably within a molar ratio of from 0.5 to 1.0.

When a siloxane compound with a molar ratio of b/(b+c)<0.01, is blended with the water-soluble resin and aged to obtain a water-soluble resin composition, development of functions such as the scratch resistance, solvent resistance and chemical resistance of the obtainable coating film, tends to be poor and problematic.

Particularly when a siloxane compound to be used in the present invention, which satisfies both ranges of $0.6 \leq a \leq 1.2$ and b/(b+c)=0.5 to 1.0 mol ratio (provided 2a+b+c=4), is blended to the water-soluble resin and aged to obtain a water-soluble resin composition, the storage stability of the liquid will be excellent, and development of functions such as scratch resistance, solvent resistance and chemical resistance, will be most remarkable when the composition is formed into a coating film.

Specific examples of the siloxane compound represented by the formula (A1): $SiO_aX_bY_c$, include tetraalkoxysilane compounds such as tetramethoxysilane, tetraethoxysilane, tetra-n-propoxysilane, tetraisopropoxysilane, tetra-n-butoxysilane, tetraisobutoxysilane, tetra-t-butoxysilane and tetraphenoxysilane, and/or their partially hydrolyzed condensates; trialkoxysilane compounds such as methyltrimethoxysilane, methyltriethoxysilane, methyltripropoxysilane, methyltriisopropoxysilane, ethyltrimethoxysilane, ethyltriethoxysilane, ethyltripropoxysilane, ethyltriisopropoxysilane, propyltrimethoxysilane, propyltriethoxysilane, butyltrimethoxysilane, butyltriethoxysilane, pentyltrimethoxysilane, pentyltriethoxysilane, hexyltrimethoxysilane, hexyltriethoxysilane, phenyltrimethoxysilane, phenyltriethoxysilane, phenyltripropoxysilane, phenyltriisopropoxysilane, benzyltrimethoxysilane, benzyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-methacryloxypropyltrimethoxysilane, 3-methacryloxypropyltriethoxysilane, vinyltrimethoxysilane, vinyltriethoxysilane, 3-mercaptopropyltrimethoxysilane, 3-mercaptopropyltriethoxysilane, 3-aminopropyltriethoxysilane, N-(2-aminoethyl)-3-aminopropyltrimethoxysilane and 3-ureidopropyltriethoxysilane, and/or their partially hydrolyzed condensates; dialkoxysilane compounds such as dimethyldimethoxysilane, dimethyldiethoxysilane, diethyldimethoxysilane, diethyldiethoxysilane, diphenyldimethoxysilane, diphenyldiethoxysilane, 3-glycidoxypropylmethyldimethoxysilane, 3-methacryloxypropylmethyldimethoxysilane, 3-mercaptopropylmethyldimethoxysilane, 3-aminopropylmethyldimethoxysilane and N-(2-aminoethyl)-3-aminopropylmethyldimethoxysilane, and/or their partially hydrolyzed condensates; and chlorosilane compounds such as methyltrichlorosilane, vinyltrichlorosilane, phenyltrichlorosilane, methyldichlorosilane, dimethyldichlorosilane, dimethylchlorosilane, methylvinyldichlorosilane, 3-chloropropylmethyldichlorosilane, diphenyldichlorosilane and methylphenyldichlorosilane, and/or their partially hydrolyzed condensates.

These siloxane compounds may be used alone or in combination as a mixture of two or more of them.

(3) Blending of the Water-soluble Resin Having Siloxane Bonds and the Siloxane Compound, and Aging In the present invention, the above-described water-soluble resin having siloxane bonds and the siloxane compound are blended and aged under specific conditions, whereby, as compared with the conventional aqueous resin composition obtained by simply blending a siloxane compound to an aqueous resin or a hydrolyzable silyl group-containing aqueous resin, the storage stability of the obtainable aqueous resin composition containing the siloxane compound is good, and a coating film obtainable by coating such a resin composition to various substrates, provides excellent characteristics with respect to e.g. high hardness, scratch resistance, chemical resistance and weather resistance, even when the blending amount of the siloxane compound is increased to a large extent.

The blending of the siloxane compound and the water-soluble resin having siloxane bonds of the present invention, may be carried out by mixing both within a temperature range of from room temperature to 200° C. The blending method is not particularly limited.

Industrially, it is possible to employ a method wherein both are charged into an apparatus capable of mixing or stirring, such as a mixer or reactor, and thoroughly mixed for blending, or a method wherein the water-soluble resin having siloxane bonds is preliminarily stirred, and the siloxane compound is gradually added and mixed thereto for blending.

In the present invention, after the above-described blending, the obtained blended liquid is heated and aged at a pH of from 2 to 11 at a liquid temperature of from 0 to 200° C. for from 1 to 8 hours, whereby the added siloxane compound undergoes hydrolytic condensation in the water-soluble resin having siloxane bonds and is partially reacted with the water-soluble resin having siloxane bonds to form siloxane bonds, thereby to obtain a water-soluble resin composition having a sea-island structure with particulates of the siloxane compound having an inertia radius of from 20 to 200 Å uniformly dispersed in the water-soluble resin as matrix, wherein the siloxane compound is partially bonded to the matrix resin. The aging is carried out preferably at a temperature of from 40 to 90° C. for from 1 to 8 hours, and the pH of the system is more preferably from 6 to 11.

The water-soluble resin compositions thereby obtained may be further diluted, after the aging, with water or other various solvents or dispersants. Further, after the aging, the solvent may be removed to obtain a completely aqueous system.

The blending ratio of the water-soluble resin having siloxane bonds to the siloxane compound, is such that by the weight ratio of the non-volatile contents of both, the water-soluble resin having siloxane bonds/the siloxane compound=99.99/0.01 to 1/99, preferably 97/3 to 40/60.

When the blending ratio of the water-soluble resin having siloxane bonds/the siloxane compound is from 99.99/0.01 to 40/60, the resulting resin composition shows a characteristic such that the nature of the resin side is strong, and the inorganic nature is added thereto (the film-forming performance, light resistance, durability, water-proofing property). On the other hand, when the blending ratio of the water-soluble resin having siloxane bonds/the siloxane compound is from 39/61 to 1/99, as a thick film, the film-forming ability is weak, and the composition shows inorganic characteristics (heat resistance, high hardness, high strength).

In the present invention, the blend liquid after the above-described aging (hereinafter referred to as the water-soluble resin composition) may contain additives such as a stabilizer, a pH regulating agent, a surfactant and a viscosity regulating agent. Further, a known additive such as a pigment, a filler, a dispersant, an antiseptic, a fungicide or a plasticizer, or a curing agent which will be described hereinafter, may be incorporated.

Further, a water-soluble resin composition having a high blend ratio of the siloxane compound may be used as incorporated to a coating agent or coating material as an antiblocking additive for the coating material or as an additive to improve the surface hardness.

(4) Curing Agent

To the aqueous resin composition of the present invention, a curing agent may be incorporated in order to further improve the chemical resistance, the coating film hardness and the weather resistance.

The curing agent is not particularly limited so long as it is a resin having functional groups (such as epoxy groups, glycidyl groups, isocyanate groups, aziridine, oxazoline rings, carbodiimide groups) which are reactive with the functional groups on the resin side (such as carboxyl groups, hydroxyl groups, sulfonic groups, amino groups) and with functional groups on the siloxane compound side (such as silanol groups and hydrolyzable silyl groups).

The resin may be of a kind such as an epoxy resin, a polyisocyanate resin, aziridine, a melamine resin, a resin having aziridine or oxazoline rings or a resin having carbodiimide groups.

The resin may be of a type such as a solvent type resin or an aqueous type resin (water-dispersible type and water-soluble type) or a bulk resin. Particularly preferred is an aqueous type resin.

The above curing agents may be employed alone or in combination as a mixture of two or more of them. The curing agent-incorporated liquid is preferably one having a pot life in practical use. It may be used in the form of a one pack type or in the form of a two pack type comprising two liquids which will be mixed before use. In the latter case, the pot life of the mixed liquid may be from 10 hours to three days for practical use.

With respect to the amount of the curing agent, the molar ratio of the functional groups of the curing agent to the functional groups on the resin side and the siloxane compound side may be from 10/1 to 1/4, preferably 3/1 to 1/2. If the molar ratio of the functional groups is less than 10/1, no adequate effect for improving the properties will be obtained by the incorporation of the curing agent, and if it exceeds 1/4, the stability of the curing agent-incorporated liquid tends to be poor, and no adequate pot life for practical use tends to be obtainable, and gelation is likely to occur.

As a coating method for such a water-soluble resin composition, it is possible to form a film on a substrate or wire material made of a polymer, a metal or a ceramic by e.g. a dipping method, a spin coating method or a spraying method, or to coat a coating material prepared by incorporating the above-mentioned pigment, filler, dispersant, etc. thereto, on a metal building material, an inorganic building material or a cement-cured product by means of a roll coater, a curtain coater or a spray to form a film, and it is also possible to apply a heating step. Further, it is also possible to carry out direct spray coating on an inorganic building material, a metal building material, bricks, etc., at the construction site.

The water-soluble resin composition of the present invention is excellent in the storage stability of the liquid, and the coating film thereby obtainable has a characteristic such that it is excellent in high hardness, solvent resistance, chemical resistance and weather resistance.

Now, the second aspect of the present invention will be described in detail.

(1') Water-dispersible Resin Having Hydrolyzable Silyl Groups

The water-dispersible resin having hydrolyzable silyl groups which can be used in the present invention, is not particularly limited so long as it has hydrolyzable silyl groups and is dispersible in water. Specifically, it may be a resin such as a radical polymerization resin or an ion polymerization resin, such as an acrylic resin, an acryl/styrene copolymer resin, a vinyl acetate resin, a vinyl acetate/acrylic copolymer resin, an ethylene/vinyl acetate copolymer resin, an olefinic resin, a vinyl chloride type resin, a vinylidene chloride resin, a vinyl chloride/acrylic copolymer resin or a styrene/butadiene copolymer resin. Further, a condensed resin such as a urethane resin, a polyester resin, a nylon resin, a phenoxy resin or an epoxy resin, may also be used.

The hydrolyzable silyl groups may specifically be alkoxysilyl groups, acetoxysilyl groups, oximesilyl groups or amidesilyl groups, represented by the formula (C) as described above with respect to the water-soluble resin in the first aspect of the present invention.

As a method for synthesis of such a water-dispersible resin, a conventional method such as an emulsion polymerization method or a post emulsion method may be mentioned.

Among the above-mentioned resins, a water-dispersible resin of an acrylic resin (inclusive of an acryl/styrene copolymer resin) or a water-dispersible resin of a urethane resin is particularly preferred from the viewpoint of the coating film properties.

By introducing hydrolyzable silyl groups, the blend stability and development of the desired coating film properties can be achieved. For the introduction of hydrolyzable silyl groups, the following methods may, for example, be mentioned.

A method of copolymerizing a radical double bonding alkoxysilane, acetoxysilane, oximesilane or amidesilane having a hydrolyzable silyl group, or a mercapto alkoxysilane, mercapto acetoxysilane, mercapto oximesilane or mercapto amidesilane having a chain transfer effect, during the radical polymerization.

A method of grafting a polyolefinic resin and the above-mentioned radical double bonding silane in the presence of a radical initiator.

A method of bonding an aminealkoxysilane, amineoximesilane, amineamidesilane, amineacetoxysilane, glycidylalkoxysilane, glycidylacetoxysilane, glycidyloximesilane, glycidylamidesilane, isocyanatealkoxysilane, isocyanateacetoxysilane, isocyanateoximesilane, isocyanateamidesilane, chloroalkoxysilane, chloroacetoxysilane, chlorooximesilane or chloroamidesilane, which is reactive with a polyfunctional group, or an alkoxysilane, acetoxysilane, oximesilane or amidesilane having a carboxyl group, to the resin during or after polymerization of the resin.

For example, a stable water-dispersible resin having hydrolyzable silyl groups and/or silanol groups, can be obtained by introducing glycidyl groups to the resin and reacting and imparting aminosilane thereto, or reacting and imparting glycidylsilane to the carboxyl groups of a resin.

The amount of hydrolyzable silyl groups to be introduced is preferably such that the alkoxysilanes, acetoxysilanes, oximesilanes or amidesilanes to be used are within a range of from 0.1 to 70 parts by weight, more preferably within a range of from 1 to 30 parts by weight, per 100 parts by weight of the total amount of the resin monomers.

If the alkoxy group-containing silanes, the acetoxy group-containing silanes, the oxime group-containing silanes or the amide group-containing silanes to be introduced into the resin, are less than 0.1 part by weight per 100 parts by weight of the total amount of the resin monomers, the storage stability of a water-dispersible resin composition obtained by incorporating the siloxane compound which is described hereinafter, tends to be poor, and the properties of the coating film such as the chemical resistance and weather resistance, tend to be hardly obtainable. On the other hand, if they exceed 70 parts by weight per 100 parts by weight of the total amount of the resin monomers, the water-dispersible resin itself is likely to be gelled, whereby a stable polymer can hardly be obtainable.

Preparation of Water-dispersible Resin Having Hydrolyzable Silyl Groups by an Emulsion Polymerization Method The water-dispersible resin having hydrolyzable silyl groups, can be produced by a conventional emulsion polymerization method.

As the monomer components to be used for polymerization, it is possible to selectively use at least one member among acrylates, methacrylates, styrene or its derivatives, acrylonitrile, vinyl acetate and other vinyl monomers, and diene monomers such as butadiene, chloroprene and isoprene, and as an essential component, a radical double bonding monomer having a hydrolyzable silyl group or a mercaptosilane having a hydrolyzable silyl group, or a hydrolyzable silane having a reactive glycidyl group.

Specific examples of the methacrylates include methyl methacrylate, ethyl methacrylate, n-butyl methacrylate, t-butyl methacrylate, i-butyl methacrylate and 2-ethylhexyl methacrylate.

Specific examples of the acrylates include methyl acrylate, ethyl acrylate, n-butyl acrylate, i-butyl acrylate, 2-ethylhexyl acrylate and octyl acrylate. These methacrylates and acrylates are usually used alone or in combination as a mixture of two or more of them.

Examples of the above-mentioned styrene derivatives include styrene, α-methylstyrene and vinyltoluene.

Other vinyl monomers include, for example, (meth) acrylonitrile, (meth)acrylamide, N-methylol(meth) acrylamide, 2-hydroxyethyl (meth)acrylate, glycidyl (meth) acrylate, N,N-dimethylaminoethyl acrylate, N,N-diethylaminoethyl acrylate, methoxyethyl (meth)acrylate, butoxyethyl (meth)acrylate, vinyl acetate, vinyl propionate, vinyl versatate and vinyl chloride.

Specific examples of the alkoxysilanes, acetoxysilanes, oximesilanes and amidesilanes, having hydrolyzable silyl groups, include alkoxysilyl group-containing unsaturated monomers such as vinyl trimethoxysilane, vinyl triethoxysilane, methylvinyl dimethoxysilane, dimethylvinyl methoxysilane, dimethylvinyl ethoxysilane, methylvinyl diethoxysilane, vinyl tris(methoxyethoxy)silane, vinyl triacetoxysilane, methylvinyl diacetoxysilane, dimethylvinyl acetoxysilane, 3-methacryloxypropyl trimethoxysilane, 3-methacryloxypropylmethyl dimethoxysilane, 3-methacryloxypropyl dimethylmethoxysilane, 3-methacryloxypropyl triethoxysilane, 3-methacryloxypropylmethyl diethoxysilane, 3-methacryloxypropyl dimethylethoxysilane and 3-methacryloxypropyl trioximesilane.

The hydrolyzable silyl group-containing monomers having chain transfer effects, include, for example, 3-mercaptopropyl trimethoxysilane, 3-mercaptopropyl triethoxysilane, 3-mercaptopropylmethyl dimethoxysilane, 3-mercaptopropylmethyl diethoxysilane, 3-mercaptopropyl dimethylmethoxysilane, 3-mercaptopropyl dimethylethoxysilane, 3-mercaptopropyl triacetoxysilane, 3-mercaptopropylmethyl diacetoxysilane, 3-mercaptopropyl dimethylacetoxysilane and 3-mercaptopropyl trioximesilane.

Further, the aminoalkoxysilanes and aminoacetoxysilanes reactive with various functional groups include, for example, N-(2-aminoethyl)-3-aminopropyl trimethoxysilane, N-(2-aminoethyl)-3-aminopropyl triethoxysilane, N-(2-aminoethyl) -3-aminopropylmethyl dimethoxysilane, N-(2-aminoethyl)-3-aminopropylmethyl diethoxysilane, N-(2-aminoethyl)-3-aminopropyl dimethylmethoxysilane, N-(2-aminoethyl)-3-propyl dimethylethoxysilane and N-(2-aminoethyl)-3-aminopropyl triacetoxysilane.

Further, the alkoxysilanes and acetoxysilanes having glycidyl groups, include, for example, 3-glycidoxypropyl trimethoxysilane, 3-glycidoxypropyl triethoxysilane, 3-glycidoxypropylmethyl dimethoxysilane, 3-glycidoxypropyl dimethylmethoxysilane, 3-glycidoxypropyl dimethylethoxysilane and 3-glycidoxypropyl triacetoxysilane.

The alkoxysilanes and acetoxysilanes having chlorine, include, for example, 3-chloropropyl trimethoxysilane, 3-chloropropyl triethoxysilane, 3-chloropropylmethyl dimethoxysilane, 3-chloropropylmethyl diethoxysilane, 3-chloropropyl dimethylmethoxysilane, 3-chloropropyl dimethylethoxysilane and 3- chloropropyl triacetoxysilane.

Other than these silanes having hydrolyzable silyl groups, oxime silanes or amide silanes may also be used.

These silanes having hydrolyzable silyl groups may be represented by the formula (D) as described above with respect to the water-soluble resin in the first aspect of the present invention, and they may be used alone or in combination as a mixture of two or more of them.

When these monomers are subjected to emulsion polymerization, it will be necessary to copolymerize a radical polymerizable monomer having a hydrophilic nature in order to stabilize the formed emulsion particles during the polymerization.

The radical polymerizable monomer having a hydrophilic nature may be the same as described above with respect to the water-soluble resin in the first aspect of the present invention.

Among such radical polymerizable monomers having hydrophilic groups, an anionic monomer or a cationic monomer is preferred from the viewpoint of the stability in the pH range. If a nonionic monomer is introduced in an amount required to stabilize the emulsion, there will be a problem from the viewpoint of water resistance of the coating film.

If the amount of such a hydrophilic monomer is too small, the stability during the emulsion polymerization tends to deteriorate, and if it is too much, water resistance of the dried coating film tends to be poor. Therefore, it is used within a range of from 0.1 to 20 parts by weight, preferably from 1 to 5 parts by weight, per 100 parts by weight of the total amount of the polymerizable monomers.

The emulsion polymerization reaction is carried out in an aqueous medium in the presence of an emulsifier with stirring at a predetermined temperature by supplying the monomers and the polymerization initiator all at once or continuously.

The amount of the emulsifier is usually within a range of from 0.05 to 10 parts by weight, preferably from 0.1 to 5 parts by weight, per 100 parts by weight of the total amount of the polymerizable monomers. Specific examples of the emulsifier may be the same as those mentioned above with respect to the water-soluble resin in the first aspect of the present invention.

Further, an emulsifier which is commercially available as a so-called reactive emulsifier and which has a polymerizable double bond in its molecular structure, may also be employed.

The amount of the reactive emulsifier is usually at most 10 parts by weight, preferably at most 8 parts by weight, more preferably at most 5 parts by weight, per 100 parts by weight of the total amount of the polymerizable monomers. Examples of the reactive emulsifier include "ADEKARIA SOAP SE-10N", manufactured by Asahi Denka Kogyo K.K., "LATEMURU S-1800", manufactured by Kao Corporation, "ELEMINOL JS-2", manufactured by Sanyo Kasei Kogyo K.K., "AKUARON HS-10", manufactured by Daiichi Kogyo Seiyaku Co., Ltd. and "ANTOX MS-60", manufactured by Nippon Nukazai K.K.

Further, a chain transfer agent such as various mercaptans, α-methylstyrene or an alkyl halide, may be employed as the case requires. Such a chain transfer agent is employed mainly for the purpose of adjusting the molecular weight of the polymer to improve the water-dispersibility or the film-forming property. Its amount is usually from 0.01 to 10 parts by weight per 100 parts by weight of the total amount of she polymerizable monomers. If it is less than 0.01 part by weight, no adequate effects for lowering the molecular weight will be obtained, and if it exceeds 10 parts by weight, it is likely to inhibit the polymerization thus leading to a problem in the polymerizability.

Further, a water-soluble polymer such as polyvinyl alcohol or hydroxylethyl cellulose, a water-soluble acrylic copolymer or a copolymer of sodium styrenesulfonate may be used alone or in combination with the above-mentioned emulsifier.

The monomer concentration during the polymerization is usually from 30 to 70 wt %, preferably from 35 to 65 wt % in the total amount. As the polymerization initiator, a radical polymerization initiator which is commonly used, for example, a persulfate such as ammonium persulfate or potassium persulfate, an azo type polymerization initiator such as 2,2'-azobisisobutyronitrile or 2,2'-(2,4-dimethylvaleronitrile), or a peroxide type polymerization initiator such as benzoyl peroxide or lauryl peroxide, may, for example, be mentioned.

The amount of the radical polymerization initiator is usually from 0.2 to 10 parts by weight, preferably from 0.3 to 5 parts by weight, per 100 parts by weight of the total amount of the polymerizable monomers. The reaction time for the polymerization is usually from 2 to 16 hours, and the temperature during the polymerization is usually from 60 to 100° C.

The neutralization step is carried out usually at a temperature of from 0 to 50° C., preferably from 20 to 30° C., and the timing of the neutralization may be before or after the polymerization, but after the polymerization is preferred with a view to suppressing hydrolysis of monomers. This neutralization step will not be required when a nonionic monomer is used for the emulsion polymerization.

The degree of neutralization is such that, for example, in the case of a carboxyl group-containing water-soluble resin, at least 20 mol % of carboxyl groups may be neutralized, and preferably, at least 30 mol %, more preferably at least 80 mol % may be neutralized.

As the neutralizing agent to be used for the neutralization, in the case of an anionic monomer, a basic compound such as ammonia or an organic amine may be used. Specific examples of the organic amine include an alkylamine such as monomethylamine, diethylamine or triethylamine, an alkanolamine such as monoethanolamine, diethanolamine, triethanolamine, dimethylaminoethanol or diethylaminoethanol, morpholine, pyridine and piperazine.

Further, an inorganic water-soluble alkali may also be used, and it may, for example, be sodium hydroxide, potassium hydroxide, sodium hydrogencarbonate or pyrophosphoric acid.

In a case where a cationic monomer is used for the emulsion polymerization, water-dispersibility can be obtained by neutralizing amino groups with an inorganic acid or an organic acid. The degree of neutralization may be such that, for example, in the case of an amino group-containing water-dispersible resin, at least 20 mol % of amino groups may be neutralized, and preferably, at least 30 mol %, more preferably at least 80 mol %, may be neutralized. As a neutralizing agent to be used here, an organic acid such as formic acid, acetic acid, propionic acid, succinic acid, citric acid or malic acid, or an inorganic acid such as hydrochloric acid, phosphoric acid, sulfuric acid or nitric acid, may, for example, be used.

A nonionic monomer is a monomer capable of emulsifying the resin without neutralization, and the amount required for emulsification is usually from 1 to 30 parts by weight, preferably from 5 to 10 parts by weight, per 100 parts by weight of the total amount of the polymerizable monomers.

The weight average molecular weight of the water-dispersible resin having hydrolyzable silyl groups, obtainable by the emulsion polymerization method, is usually from 5,000 to 1,000,000, preferably from 50,000 to 500,000.

Preparation of Water-dispersible Synthetic Resin Having Hydrolyzable Silyl Groups by a Post Emulsification Method It is preferred to carry out emulsion polymerization in a water-soluble organic solvent taking into consideration the subsequent step of imparting water-dispersibility. Such a water-soluble organic solvent may, for example, be an alcohol such as methyl alcohol, ethyl alcohol, isopropyl alcohol, n-propyl alcohol or butyl alcohol, a ketone such as methyl ethyl ketone, or an ether such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether or propylene glycol monobutyl ether.

The polymerizable monomers to be used may be the same as the group of monomers described with respect to the above emulsion polymerization.

With respect to the constitution of monomers to impart water-dispersibility subsequently, the monomer to impart anionic nature is required to be from 5 to 50 parts by weight, per 100 parts by weight of the total amount of the polymerizable monomers, the nonionic monomer is required to be from 7 to 40 parts by weight, and the cationic monomer is required to be from 5 to 50 parts by weight.

Especially when an unsaturated carboxylic acid is used among anionic monomers, its amount is usually from 5 to 50 parts by weight, preferably from 10 to 40 parts by weight, per 100 parts by weight of the total amount of the polymerizable monomers. If it is less than 5 parts by weight, the water-dispersibility tends to be poor, and if it exceeds 50 parts by weight, the water resistance and alkali resistance of the coating film tend to be poor.

The degree of neutralization may be such that at least 20 mol % of carboxyl groups contained are neutralized, and preferably at least 30 mol %, more preferably at least 60 mol %, may be neutralized. When the carboxyl groups are at least 30 mol %, if the degree of neutralization is 80%, water-solubilization tends to occur, and the degree of neutralization is preferably at most 60 mol %.

As a neutralizing agent to be used for the neutralization, in the case of an anionic monomer, a basic compound such as ammonia or an organic amine may be mentioned. Specific examples of the organic amine include an alkylamine such as monomethylamine, diethylamine or triethylamine, an alkanolamine such as monoethanolamine, diethanolamine, triethanolamine, dimethylaminoethanol or diethylaminoethanol, morpholine, pyridine and piperazine.

Further, an inorganic water-soluble alkali may also be used, and it may, for example, be sodium hydroxide, potassium hydroxide, sodium hydrogencarbonate or pyrophosphoric acid.

In the case of a cationic monomer, the water-dispersibility can be imparted by neutralizing amino groups with an inorganic acid or an organic acid. However, if the amino group-containing monomer is less than 5 wt %, the water-dispersibility tends to be inadequate, and if it exceeds 50 wt %, the water resistance or acid resistance of the coating film tends to be poor. The degree of neutralization may be such that, for example, in the case of an amino group-containing water-dispersible resin, at least 20 mol % of amino groups are neutralized, and preferably at least 30 mol %, more preferably at least 60 mol %, may be neutralized. Like an anionic monomer when the cationic monomer is used at least 30 wt %, if the degree of neutralization exceeds 80 mol %, water-solubilization tends to occur, and the degree of neutralization is preferably at most 60 mol %. The neutralizing agent to be used here may, for example, be an organic acid such as formic acid, acetic acid, propionic acid, succinic acid, citric acid or malic acid, or an inorganic acid such as hydrochloric acid, phosphoric acid, sulfuric acid or nitric acid.

The nonionic monomer is a monomer capable of imparting water-dispersibility to the resin without neutralization, and its required amount for imparting water-dispersibility is usually from 7 to 40 parts by weight, preferably from 15 to 40 parts by weight, per 100 parts by weight of the total amount of the polymerizable monomers.

Further, a chain transfer agent such as various mercaptans, α-methylstyrene or an alkyl halide, may be employed as the case requires. Such a chain transfer agent is employed mainly for the purpose of adjusting the molecular weight of the polymer to improve the water-dispersibility. Its amount is usually from 0.01 to 10 parts by weight, per 100 parts by weight of the total amount of the polymerizable monomers.

The polymerization method is such that a mixture comprising an alkoxysilyl group-containing monomer, other hydrophilic group-containing monomers and other ethylenically unsaturated monomers, is charged all at once or in a divided fashion to the above-mentioned hydrophilic solvent or water, or a mixture thereof, and the above-mentioned polymerization initiator is added to carry out radical polymerization. The concentration of monomers during the polymerization is from 30 to 70 wt %; preferably from 35 to 65 wt %, in their total amount, and the radical polymerization initiator is used in an amount of from 0.1 to 10 parts by weight, preferably from 0.3 to parts by weight, per 100 parts by weight of the total amount of the polymerizable monomers. The reaction time is usually from 2 to 16 hours, and the reaction temperature during the polymerization is usually from 60 to 100° C.

The water-dispersibility-imparting step varies depending upon the type of the above-mentioned hydrophilic monomer. In the case of a cationic or anionic monomer, the desired water-dispersible resin having hydrolyzable silyl groups can be obtained by adding water and a neutralizing agent capable of imparting water-dispersibility, followed by stirring and emulsification.

The neutralization step is carried out usually at a temperature of from 0 to 90° C., and it is possible to shorten the time for imparting water-dispersibility by increasing the temperature. In the case of a nonionic monomer, such a step is not required.

The weight average molecular weight of the water-dispersible resin having hydrolyzable silyl groups, obtainable by the post emulsification method, is usually from 500 to 500,000, preferably from 1,000 to 100,000.

(2') Siloxane Compound of the Formula (A2)

The siloxane compound to be used for the aqueous composition of the present invention is one represented by the formula (A2):

$$SiO_aX_b \tag{A2}$$

wherein X is a hydrolyzable group, $0 \leq a \leq 1.4$, and b=1.2 to 4.0, provided 2a+b=4.

In the present invention, the siloxane compound to be blended with the above-mentioned water-dispersible resin having hydrolyzable silyl groups, may be any compound so long as it is a siloxane compound represented by the above formula. The coefficient a is a coefficient representing the siloxane condensation degree of the siloxane compound, and the case where a=0, represents a monomer of the silicon compound having no siloxane bond which, however, is capable of forming siloxane bonds by hydrolytic condensation and thus, is regarded as a siloxane compound in the present invention. The case where a>0, represents an oligomer having siloxane bonds.

The siloxane compound to be used in the present invention may be a single monomer of the silicon compound or a single oligomer, so long as it is represented by the above formula (A2). Such monomers and oligomers may be used alone or in combination as a mixture of two or more of them.

The formula (A2) corresponds to a molecular formula in the case of a single compound or to an average molecular weight in the case of a composition having a molecular weight distribution or a mixture of compounds:

When a>1.4, the siloxane compound tends to have high viscosity and tends to be gelled, whereby the storage stability deteriorates, and it can hardly be useful. The case where a=2, represents silica ($SiO_2$) having no organic functional group such as a hydrolyzable group X which will be described hereinafter. The silica wherein a=2, such as colloidal silica or fumed silica, is particulate silica having no organic functional group, and accordingly, when it is blended with the water-dispersible resin used in the present invention to obtain a coating composition, the storage stability of the composition will be good, but the effect for improving the hardness, solvent resistance and chemical resistance when made into a coating film, can not be expected.

The range of coefficient a is usually $0 \leq a \leq 1.4$, preferably $0.5 \leq a \leq 1.4$, more preferably $0.6 \leq a \leq 1.2$, whereby when a resin composition obtainable by blending and aging it with the water-dispersible resin, is made into a coating or covering film, development of such functions as the solvent resistance and chemical resistance, will be remarkable, such being most desirable.

X is a hydrolyzable group and is a group capable of forming a siloxane bond by e.g. a hydrolytic condensation reaction. Such a hydrolyzable group includes a halogen atom, a hydrogen atom, a hydroxyl group and an OR group, and is at least one member among them.

The halogen atom may, for example, be —F, —Cl, —Br or —I.

The OR group is at least one member among groups wherein R is an alkyl group, a cycloalkyl group, an alkoxyalkyl group, an aryl group, an aralkyl group or an alkylpolyoxyalkylenyl group. Typical examples of R will be shown below.

The alkyl group may, for example, be a methyl group, an ethyl group, a propyl group, a butyl group, a pentyl group, a hexyl group, a heptyl group, a 2-ethylhexyl group, an octyl group or a decyl group, and may be of straight chain or branched chain.

The cycloalkyl group may, for example, be a cyclohexyl group, a cyclobutyl group or a cyclopentyl group.

The alkoxyalkyl group may, for example, be a methoxyethyl group, an ethoxyethyl group or a butoxyethyl group.

The aryl group may, for example, be a phenyl group, a tolyl group or a xylyl group.

The aralkyl group may, for example, be a benzyl group or a phenethyl group.

The alkylpolyoxyalkylenyl group may, for example, be $CH_3—(OCH_2CH_2)_n—$, $C_2H_5—(OCH_2CH_2)_n—$, $CH_3—(OCH_2CHCH_3)_n—$ or $C_2H_5—(OCH_2CHCH_3)_n—$.

When X is a halogen atom, a hydrogen halide will be produced as a byproduct by the hydrolysis, and when it is a hydroxyl group, hydrogen will be formed as a byproduct. Therefore, it is necessary to take a due care for inflammability, corrosiveness and toxicity of these byproducts. For this reason, X is preferably the OR group, and taking into consideration the reaction with the water-dispersible resin and efficiency for forming a siloxane bond by the hydrolytic condensation of the siloxane compound itself, R is preferably selected from at least one member among a methyl group, an ethyl group, a propyl group and a butyl group, whereby high cross-linking is attainable in the process for forming a coating or covering film from a resin composition obtained by blending and aging the siloxane compound with the water-dispersible resin, and development of functions such as solvent resistance and chemical resistance will be most remarkable with the resulting coating film.

Selection of the hydrolyzable group for X in the siloxane compound to be used for the resin composition of the present invention, can be optionally made depending upon the purpose of the water-dispersible resin composition. Namely, the selection may be made taking into consideration the compatibility with the water-dispersible resin component in the water-dispersible resin composition of the present invention, and the storage stability, as well as development of such functions as flexibility, solvent resistance and chemical resistance with the obtainable coating film.

Specific examples of the siloxane compound represented by the formula (A2): $SiO_aX_b$, include tetraalkoxysilane compounds such as tetramethoxysilane, tetraethoxysilane, tetra-n-propoxysilane, tetraisopropoxysilane, tetra-n-butoxysilane, tetraisobutoxysilane, tetra-t-butoxysilane and tetraphenoxysilane, and/or their partially hydrolyzed condensates. Such an alkoxysilane monomer or its partially hydrolyzed condensate may be one having two or more different types of hydrolyzable groups in one molecule.

These siloxane compounds may be used alone or in combination as a mixture of two or more of them. As commercial products, "MKC silicate MS51" and MKC silicate MS56" manufactured by Mitsubishi Chemical Corporation, are available, which are hydrolytic condensates of tetramethoxysilane (with weight average molecular weights of from 500 to 800, and from 1,000 to 1,400, respectively) and can be preferably used as high quality products with a low content of tetramethoxysilane as the monomer.

(3') Blending of the Water-dispersible Resin Having Hydrolyzable Silyl Groups and the Siloxane Compound, and Aging In the second aspect of the present invention, the above-described water-dispersible resin having hydrolyzable silyl groups and the siloxane compound are blended and aged under specific conditions, whereby, as compared with the conventional aqueous resin composition obtained by simply blending a siloxane compound to an aqueous resin or a hydrolyzable silyl group-containing aqueous resin, the storage stability of the obtainable resin composition is good, and a coating film obtainable by coating such a resin composition to various substrates, provides excellent characteristics with respect to e.g. scratch resistance, chemical resistance and weather resistance, even when the blending amount of the siloxane compound is increased to a large extent.

The blending of the siloxane compound and the water-dispersible resin having hydrolyzable silyl groups of the present invention, may be carried out by mixing both within a temperature range of from 0 to 200° C., preferably from room temperature to 100° C. The blending method is not particularly limited.

Industrially, it is possible to employ a method wherein both are charged into an apparatus capable of mixing or stirring, such as a mixer or reactor, and thoroughly mixed for blending, or a method wherein the water-dispersible resin having hydrolyzable silyl groups is preliminarily stirred, and the siloxane compound is gradually added and mixed thereto for blending.

After the above-described blending, the obtained blended liquid is heated and aged at a pH of from 6 to 12 at a liquid temperature of from 0 to 200° C. for from 1 to 8 hours, whereby the added siloxane compound undergoes hydrolytic condensation in the water-dispersible resin having hydrolyzable silyl groups and is partially reacted with the water-dispersible resin having hydrolyzable silyl groups to form siloxane bonds, thereby to obtain a water-dispersible resin composition having good storage stability, wherein the siloxane compound partially bonded to the water-dispersible resin as matrix, is present in the particles of the matrix resin. The aging is carried out preferably at a temperature of from 40 to 90° C. for from 1 to 8 hours, and the pH of the system is more preferably from 6 to 11.

By the aging, the blended siloxane compound is further condensed, whereby the coefficient a increases to present a state wherein a siloxane component represented by the following formula (B1) is contained in the aqueous resin composition:

$$SiO_{a'}X_{b'}Y_{c'} \quad (B1)$$

wherein X is a hydrolyzable group, Y is a non-hydrolyzable group, $1.4<a'<2$, and $b'/(b'+c')=0.01$ to $1.0$, provided $2a'+b'+c'=4$.

The determination of the formula of the siloxane component in the resin composition can be readily carried out, for example, by the determination of the siloxane condensation degree by Si-NMR. Specifically, the determination can be carried out as follows.

When the chemical shift value of tetramethylsilane is taken as 0 ppm, the hydrolytic condensate of tetraalkoxysilane (tetra functional) gives five groups of peaks between the chemical shift values of −75 ppm to −120 ppm, which will be referred to as $Q_0$, $Q_1$, $Q_2$, $Q_3$ and $Q_4$, respectively. Each peak derives from the number of siloxane bonds. Namely, $Q_0$ represents a monomer wherein the number of siloxane bonds is 0, $Q_1$ represents one wherein the number of siloxane bonds is 1, $Q_2$ represents one wherein the number of siloxane bonds is 2, $Q_3$ represents one wherein the number of siloxane bonds is 3, and $Q_4$ represents one wherein the number of siloxane bonds is 4. The area ratios of these respective peaks are determined, and calculation is carried out in accordance with the following formula, whereby the condensation degree a can be obtained. In the case of silica ($SiO_2$), $a=2$.

$$a = A \times 0 + B \times 0.55 + C \times 1.0 + D \times 1.5 + E \times 2$$

where the respective area ratios of $Q_0$, $Q_1$, $Q_2$, $Q_3$ and $Q_4$ are A:B:C:D:E, provided that $A+B+C+D+E=1$.

Further, from the following formula, the siloxane-forming degree of a tetra-functional alkylsilicate can be obtained.

Siloxane-forming Degree (%)=$(a/2) \times 100$

Further, the Si-NMR peaks of a tri-functional substance and a tetra-functional substance have different chemical shift values. Accordingly, the respective states (condensation degrees) can be observed separately or independently.

Thus, an aqueous resin composition having good properties can be obtained. It is further possible to add water or other various solvents or dispersants as well as a plasticizer to the obtained aqueous resin composition after aging.

The blending ratio of the water-dispersible resin having hydrolyzable silyl groups to the siloxane compound, is such that by the weight ratio of the non-volatile contents of both, the water-dispersible resin having hydrolyzable silyl groups/the siloxane compound=99.99/0.01 to 1/99, preferably 97/3 to 40/60.

When the blending ratio of the water-dispersible resin having hydrolyzable silyl groups/the siloxane compound is from 99.99/0.01 to 40/60, the resulting resin composition shows a characteristic such that the nature of the resin side is strong, and the inorganic nature is added thereto (the film-forming performance, weather resistance, durability, water-proofing property). On the other hand, when the blending ratio of the water-dispersible resin having hydrolyzable silyl groups/the siloxane compound is from 39/61 to 1/99, as a thick film, the film-forming ability is weak, and the composition shows inorganic characteristics (heat resistance, high hardness, high strength).

The blend liquid after the above-described aging may contain additives such as a stabilizer, a pH regulating agent, a surfactant and a viscosity regulating agent. Further, a known additive such as a pigment, a filler, a dispersant, an antiseptic, a fungicide or a plasticizer, or a curing agent which will be described hereinafter, may be incorporated.

Further, an aqueous resin composition having a high blending ratio of the siloxane compound may be used as incorporated to a coating agent or coating material as an antiblocking additive for the coating material or as an additive to improve the surface hardness.

(4') Curing Agent

To the blend liquid after the aging, a curing agent may be incorporated in order to further improve the chemical resistance, the coating film hardness and the weather resistance.

The curing agent is not particularly limited so long as it is a resin having functional groups (such as epoxy groups, glycidyl groups, isocyanate groups, aziridine, oxazoline rings, carbodiimide groups) which are reactive with the functional groups on the resin side (such as carboxyl groups, hydroxyl groups, sulfonic groups, amino groups) and with functional groups on the siloxane compound side (such as silanol groups and hydrolyzable silyl groups).

The resin may be of a kind such as an epoxy resin, a polyisocyanate resin, aziridine, a melamine resin, a resin having aziridine or oxazoline rings or a resin having carbodiimide groups.

The resin may be of a type such as a water-dispersible type or a bulk resin. Particularly preferred is an aqueous type resin.

The above curing agents may be employed alone or in combination as a mixture of two or more of them. The curing agent-incorporated liquid is preferably one having a pot life in practical use. It may be used in the form of a one pack type or in the form of a two pack type comprising two liquids which will be mixed before use. In the latter case, the pot life of the mixed liquid may be from 10 hours to three days for practical use.

With respect to the amount of the curing agent, the molar ratio of the functional groups of the curing agent to the functional groups on the resin side and the siloxane compound side may be from 10/1 to 1/4, preferably 3/1 to 1/2. If the molar ratio of the functional groups is less than 10/1, no adequate effect for improving the properties will be obtained by the incorporation of the curing agent, and if it exceeds 1/4, the stability of the curing agent-incorporated liquid tends to be poor, and no adequate pot life for practical use tends to be obtainable, and gelation is likely to occur.

The aqueous resin composition of the present invention has characteristics such that it is excellent in the storage stability of liquid, and the resulting coating film is excellent in high hardness, solvent resistance, chemical resistance and weather resistance.

By the present invention, it is possible to provide a resin composition containing from 0.1 to 99 wt % of the siloxane compound based on the total solid content of the resin, which is capable of presenting a coating composition or coating material excellent in the storage stability, particularly a resin composition containing from 0.1 to 60 wt % of the siloxane compound, which is useful as a top coating material or an undercoating material for e.g. a metal such as iron or an inorganic siding board and which is capable of forming a coating film having the adhesion to the substrate improved and having the weather resistance and stain resistance improved, or a resin composition containing from 60 to 99 wt % of the siloxane compound, which is useful as a heat resistant coating agent and also useful as an aqueous inorganic additive to impart heat resistance, high hardness, scratch resistance or chemical resistance to a resin.

As a coating method for such a water-dispersible resin composition, it is possible to form a film on a substrate or wire material made of a polymer, a metal or a ceramic by e.g. a dipping method, a spin coating method or a spraying method, or to coat a coating material prepared by incorporating the above-mentioned pigment, filler, dispersant, etc. thereto, on a metal building material, an inorganic building material or a cement-cured product by means of a roll coater, a curtain coater or a spray to form a film, and it is also possible to apply a heating step. Further, it is also possible to carry out direct spray coating on an inorganic building material, a metal building material, bricks, etc., at the construction site.

Now, the present invention will be described in further detail with reference to Examples. However, it should be understood that the present invention is by no means restricted to such specific Examples.

In the following Examples, "%" and "parts" mean "wt %" and "parts by weight" unless otherwise specified.

EXAMPLE 1

Preparation of a Water-soluble Resin Having Siloxane Bonds

Into a four-necked flask having an internal capacity of 2 l, equipped with a stirrer, a temperature regulator, a thermometer, a reflux condenser, a dropping funnel and a nitrogen gas supply tube, 400 g of ethyl alcohol was charged, and the temperature was raised Lo 75° C. while introducing nitrogen gas. Then, 1.6 g of AIBN (2,2'-azobisisobutyronitrile) was added thereto, and then a monomer mixture liquid obtained by stirring and mixing 100 g of butyl acrylate, 200 g of methyl methacrylate, 60 g of methacrylic acid and 40 g of 3-methacryloxypropyl trimethoxysilane, was dropwise added from the dropping funnel over a period of 5 hours, and polymerization was carried out at 75° C.

After completion of the dropwise addition, 0.8 g of ADVN (2,2'-azobis-2,4-dimethylvaleronitrile) was dissolved in 2 g of ethyl alcohol and added, and the mixture was aged at 80° C. for 3 hours and then cooled, whereupon 20 g of 25% aqueous ammonia and 200 g of deionized water were added to obtain a water-soluble resin A-1 having siloxane bonds.

The obtained water-soluble resin A-1 was a transparent aqueous solution having a non-volatile content of 40.1%, a pH of 8.0 and a viscosity of 1,000 cP.

Blending and Aging

Into a four-necked flask having an internal capacity of 2 l, equipped with a stirrer, a temperature regulator, a thermometer, a reflux condenser and a dropping funnel, 1,000 g of the water-soluble resin A-1 prepared as described above and 100 g of deionized water were charged. The temperature was raised, and 100 g of MKC silicate MS51

(polymethoxysiloxane, manufactured by Mitsubishi Chemical Corporation; weight average molecular weight: 500 to 800, rational formula $SiO_{0.8}(OCH_3)_{2.4}$) as a siloxane compound, was gradually dropwise added over a period of 30 minutes by means of a dropping funnel at an internal temperature of 60° C. with stirring. Further, aging was carried out at the same temperature for 5 hours with stirring, and then, the mixture was cooled to obtain a water-soluble resin composition A-2.

This water-soluble resin composition A-2 was a transparent aqueous solution having a non-volatile content of 40.5%, a pH of 8.0 and a viscosity of 3,000 cP.

Removal of the Solvent

Into a four-necked flask having an internal capacity of 2 l, equipped with a stirrer, a temperature regulator, a thermometer, a reflux condenser or a rectifier and a dropping funnel, 1,000 g of the water-soluble resin composition A-2 prepared as described above, was charged, and the temperature was raised and 450 g was taken out while removing ethyl alcohol out of the system under reduced pressure for 5 hours while azeotropically distilling it at an internal temperature of 80° C. Further, with stirring, 460 g of deionized water was gradually dropwise added over a period of 30 minutes, and complete water-solubilization was carried out for 2 hours with stirring at the same temperature. Then, the mixture was cooled to obtain a water-soluble resin composition A-3.

This water-soluble resin composition A-3 was a transparent aqueous solution having a non-volatile content of 40.2%, a pH of 8.0 and a viscosity of 5,000 cP and containing 0.3% of ethyl alcohol.

The ethyl alcohol was measured by gas chromatography.

Analyses of the Water-soluble Resin A-1 Having Siloxane Bonds and the Water-soluble Resin Composition A-2 in Example 1

1) Determination of the Siloxane Condensation Degree by Si-NMR

In the present invention, the condensation degree can easily be ascertained by measuring Si-NMR. When the chemical shift value of tetramethylsilane is taken as 0 ppm, the hydrolytic condensate of a tetraalkoxysilane (tetra functional) will give five groups of peaks between chemical shift values of −75 to −120 ppm, which are respectively referred to as $Q_0$, $Q_1$, $Q_2$, $Q_3$ and $Q_4$. The respective peaks derive from the numbers of siloxane bonds. Namely, $Q_0$ represents a monomer wherein the number of siloxane bonds is 0, $Q_1$ represents a product wherein the number of siloxane bonds is 1, $Q_2$ represents a product wherein the number of siloxane bonds is 2, $Q_3$ represents a product wherein the number of siloxane bonds is 3, and $Q_4$ represents a product wherein the number of siloxane bonds is 4. By determining the area ratio of the respective peaks and carrying out a calculation in accordance with the following formula, the condensation degree a will be obtained. In the case of silica ($SiO_2$), a=2.

$$a = A \times 0 + B \times 0.5 + C \times 1.0 + D \times 1.5 + E \times 2$$

where the respective area ratios of $Q_0$, $Q_1$, $Q_2$, $Q_3$ and $Q_4$ are A:B:C:D:E, provided that A+B+C+D+E=1.

Further, from the following formula, the siloxane-forming degree of a four-functional methylsilicate can be obtained.

Siloxane-forming Degree (%) (a/2)×100

Likewise, the tri-functional 3-methacryloxypropyl trimethoxysilane (hereinafter referred to as A-174) used in the Example of the present invention gives four groups of peaks between the chemical shift values of from −41 to −70 ppm, which are referred to as $Q_0'$, $Q_1'$, $Q_2'$ and $Q_3'$, respectively. In the same manner as in the case of the tetrafunctional silane, the respective peaks derive from the numbers of siloxane bonds. Namely, $Q_0'$ represents a monomer wherein the number of siloxane bonds is 0, $Q_1'$ represents a product wherein the number of siloxane bonds is 1, $Q_2'$ represents a product wherein the number of siloxane bonds is 2, and $Q_3'$ represents a product wherein the number of siloxane bonds is 3.

By obtaining the area ratio of the respective peaks and carrying out a calculation in accordance with the following formula, the condensation degree a' will be obtained. In the case where all of the trifunctional groups have formed siloxane bonds, a'=1.5

$$a' = A' \times 0 + B' \times 0.5 + C' \times 1.0 + D' \times 1.5.$$

wherein the respective area ratios of $Q_0'$, $Q_1'$, $Q_2'$ and $Q_3'$ are A':B':C':D', provided that A'+B'+C'+D'=1.

Further, from the following formula, the siloxane-forming degree of the trifunctional A-174 can be obtained.

Siloxane-forming Degree (%)=(a'/1.5)×100

As described above, Si-NMR peaks of the trifunctional substance and the tetrafunctional substance have different chemical shift values. Accordingly, the respective states (condensation degrees) can be observed separately or independently.

Measurement of Si-NMP of MKC Silicate MS51

Si-NMR of MKC silicate MS51 used in Example 1, which is a partial hydrolytic condensate of tetramethoxysilane, was measured, whereby the chemical shifts of $Q_0$, $Q_1$, $Q_2$, $Q_3$ and $Q_4$ were confirmed at positions of 77 to 79, 85 to 67, 92 to 96, 100 to 104 and 106 to 120 ppm, respectively. From these peak area ratios, it was found that the siloxane condensation degree a=0.80, and the siloxane-forming degree=40.0%.

| | $Q_0$ | $Q_1$ | $Q_2$ | $Q_3$ | $Q_4$ | Condensation degree | Siloxane-forming degree |
|---|---|---|---|---|---|---|---|
| Area ratios | 0.0% | 48.8% | 43.3% | 7.97% | 0.93% | 0.80 | 40.0% |

Measurement of SI-NMR of A-174 Hydrolytic Condensate

A homopolymer which is a partial hydrolytic condensate of A-174 alone, which was used for the preparation of the water-soluble resin A-1 in Example 1, was prepared, and Si-NMR of this homopolymer was measured. The chemical shifts of $Q_0'$, $Q_1'$, $Q_2'$ and $Q_3'$ were observed at −41.0, −50.0, −59.0 and −68.5 ppm, respectively. It was thus confirmed that the tri-functional A-174 homopolymer has chemical shift values which are different from the tetra-functional methylsilicate, and it is possible to obtain the respective siloxane condensation degrees and the siloxane-forming degrees.

Measurement of Si-NMP of Water-soluble Resin A-1

The results of the measurement of Si-NMR of the water-soluble resin A-1 in Example 1, are shown below.

| | $Q_0'$ | $Q_1'$ | $Q_2'$ | $Q_3'$ | Condensation degree | Siloxane-forming degree |
|---|---|---|---|---|---|---|
| Area ratios | 3.2% | 5.9% | 47.9% | 43.0% | 1.15 | 76.9% |

From these results, it was confirmed that about 77% of the hydrolyzable silyl groups (derived from A-174) of the water-soluble resin A-1, formed siloxane bonds.

Measurement of Si-NMR of Water-soluble Resin Composition A-2

The results of the measurement of Si-NMR of the water-soluble resin composition A-2 in Example 1, which was prepared by blending and aging the above water-soluble resin A-1 and MS-51, are shown below.

Siloxane-forming degree on the side of hydrolyzable silyl groups (A-174) of the water-soluble resin A-1

|  | $Q_0'$ | $Q_1'$ | $Q_2'$ | $Q_3'$ | Condensation degree | Siloxane-forming degree |
|---|---|---|---|---|---|---|
| Area ratios | 0.0% | 5.7% | 39.6% | 54.7% | 1.24 | 82.7% |
| Difference from water-soluble resin A-1 | −3.2% | −0.2% | −8.3% | +11.7% | +0.09% | +6.0% |

Siloxane-forming degree on the side of MS51 (siloxane compound)

|  | $Q_0$ | $Q_1$ | $Q_2$ | $Q_3$ | $Q_4$ | Condensation degree | Siloxane-forming degree |
|---|---|---|---|---|---|---|---|
| Area ratios | 0.0% | 0.9% | 1.5% | 4.1% | 93.5% | 1.95 | 97.6% |
| Difference from MS51 before addition | ±10.0% | −47.9% | −41.8% | −2.87% | +92.6% | +1.15 | +57.6% |

MS51 (siloxane compound) showed a remarkable increase of $Q_4$ in the water-soluble resin A-1 having siloxane bonds, and the siloxane-forming degree increased substantially from 40% to about 98%, thus indicating that the hydrolytic condensation reaction proceeded to a state close to silica. On the other hand, the hydrolyzable silyl groups (A-174) on the water-soluble resin side also showed an increase Of $Q_3$·, and the siloxane-forming degree increased from 7.69% to 82.7%.

From these results, it is considered that by blending and aging the water-soluble resin A-1 having siloxane bonds and MS51 by the method of the present invention, MS51 has undergone a hydrolytic condensation reaction and is present in a state close to silica particles, and a part thereof is bonded to siloxane bonds and hydrolyzable silyl groups of the water-soluble resin, whereby a liquid state with good storage stability is maintained.

This is assumed also from the fact that if the water-soluble resin F-1 having no siloxane bonds, which will be described hereinafter, and MS5or the water-soluble resin A-1 having siloxane bonds and MS51, are simply blended at room temperature, the mixed composition will be finally gelled as hydrolytic condensation of MS51 progresses, since the resin component and the MS51 component do not have stable siloxane bonds.

2) Change in the Molecular Weight Ascertained by GPC Analysis

GPC Measurements of Water-soluble Resin A-1 Having Siloxane Bonds and MS51

The water-soluble resin A-1 has peaks at molecular weights of 2,700 and 8,400.

MS51 has a peak at a molecular weight of 350 to 480.

GPC measurement of Water-soluble Resin Composition A-2

The composition A-2 has peaks in the vicinity of molecular weights 2,700 and 100,000, and it has been confirmed that the peak at the molecular weight of 8,400 of the water-soluble resin A-1 and the peak in the vicinity of a molecular weight of 350 to 480 of MS51 have disappeared. This indicates that the water-soluble resin A-1 with a molecular weight of about 8,400 and MS51 were reacted to form a product with a molecular weight of about 100,000.

3) Particulates Ascertained by Small Angle X-ray Scattering Method

Small Angle X-ray Scattering Method

The presence of particulates can easily be ascertained by a means such as a small angle X-ray scattering method. Namely, by the presence of particulates, the diffraction intensity distribution of incident X-rays shows small angle X-ray scattering i.e. mild scattering so-called central scattering in the direction of the incident rays.

Scattering intensity I is given by the following Guinier formula:

$$I(h) = C \cdot \exp(-h^2 Rg^2/3)$$

where I is the scattering intensity, h is the scattering vector ($=4\pi \sin\theta/\lambda$), Rg is the inertia radius of particulates, C is a constant, $\lambda$ is 1.5418 Å, and $\theta$ is the spreading angle.

When a common logarithm is applied to both sides of the formula, the above Guinier formula will be as follows:

$$\log I(h) = \log C - (h^2 Rg^2/3)$$

Accordingly, when particulates are present, the inertia radius of the particulates can be obtained by measuring the scattering intensity, plotting a log-log graph against the scattering spectrum (the obtained plots are called Guinier plots) and obtaining the inclination.

When the inclination of the Guinier plots is k, the inertial radius Rg can be obtained from the following formula:

$$k = -Rg^2/3$$

Further, in a case where the scattering intensity is sufficient, it is possible to obtain the distance distribution function by Fourier transformation of scattering vector and to know the inertial radius from the position of the peak and the shape and the fluctuation from the width of the peak.

When the Guinier plots are substantially linear, and a single inertial radius can be obtained from the inclination, that value is taken as the inertia radius in the present invention. In a case where the Guinier plots are curved, and no single inertia radius can be obtained from the inclination, the distance distribution function is obtained by the Fourier transformation of scattering vector, and the inertia radius obtained from the position of the peak is taken as the inertia radius in the present invention.

The inertia radius Rg is correlated with the particulate radius r, and in the case of spherical particulates, the following relation will be satisfied:

$$Rg^2 = 3/5 \cdot r^2$$

In a case where twice the particulate radius r is substantially equal to the correlation length lc, there is a relation that the scattered in the sample is monodisperse and spherical, and the correlation length lc can be obtained by the following formula:

$$Lc = \int [I(h)hdh]/\int [I(h)h^2 dh]$$

The inertia radius of particulates was obtained by a small angle scattered X-ray analysis as shown below.

Conditions for Small Angle Scattered X-ray Analysis
X-ray generating apparatus:
RU-200B (rotating anode type), manufactured by Rigaku Denki K.K.
X-ray source: Cu-K α-rays, using flat plate graphite incident monochrometer
Current, voltage: 40 kV, 200 mA
Optical system: Kratky camera, manufactured by Rigaku Denki K.K., U-slit, width 70 μm, height: 15 mm
Detector: PSPC (position sensitive proportional counter), manufactured by Rigaku Denki K.K.
Light-receiving slit: height of 8 mm, total time of 4,000 seconds, number of channels: 512 (45.7 ch/deg.)
Distance from the sample to the detector: 300 mm Results of the Measurements
Result of the Measurement of MS51
The result was that the inertia radius was at most 4 Å, but this value is smaller than the lower limit detectable by this analytical method. Accordingly, can be concluded that there was no formation of particulates Result of the Measurement of Water-soluble Resin A-1
The inertia radius was 12.6 Å, and the correlation length was 28.6 Å.

Result of the Measurement of Water-soluble Resin Composition A-2
The inertial radius was 42.6 Å, and the correlation length was 61.5 Å.

Summary of the Results

| Sample | Correlation length lc | Inertia radius Rg | Particulate radius (r) From inertia radius | Particulate radius (r) From distance distribution function |
| --- | --- | --- | --- | --- |
| Water-soluble resin A-1 | 28.6 | 12.6 | 16.3 | 15.4 |
| Water-soluble resin composition A-2 | 61.5 | 42.6 | 55.0 | 44.8 |

Unit: Å

With the water-soluble resin A-1 of Example 1 having no siloxane compound (MS51) incorporated, the inertia radius Rg was about 13 Å, and the correlation length Lc was about 29 Å.

On the other hand, with the water-soluble resin composition A-2 having MS51 blended and aged, the inertia radius Rg was about 43 Å, and the correlation length Lc was about 62 Å, and thus, the scattering intensity was distinctly higher than the water-soluble resin A-1 before incorporation of MS51, and the presence of particulates was confirmed.

Further, with the water-soluble resin composition A-2 having MS51 blended and aged, the distance distribution function is bilaterally asymmetrical. From such a viewpoint that if twice the inertia radius is substantially equal to the correlation length, the particles are monodisperse and almost spherical, the particles in the present system are not monodisperse and take a deformed shape.

4) Summary of the Analyses

From the analytical results of Si-NMR, GPC and small angle X-ray scattering analysis, it is considered that the added siloxane compound (MS51) itself has grown to at least a few tens Å to form a state close to silica ($SiO_2$), and nevertheless, it is stabilized by partial siloxane bonding with the resin side, so that the entire liquid will not be gelled.

EXAMPLE 2

Preparation of Water-soluble Resin Having Siloxane Bonds

Into a four-necked flask having an internal capacity of 2 l, equipped with a stirrer, a temperature regulator, a thermometer, a reflux condenser, a dropping funnel and a nitrogen gas supply tube, 400 g of isopropyl alcohol was charged, and the temperature was raised to 75° C. while introducing nitrogen gas. Then, 1.6 g of AIBN was added thereto, and then a monomer mixture liquid obtained by stirring and mixing 100 g of butyl acrylate, 220 g of methyl methacrylate, 60 g of methacrylic acid, 20 g of 3-methacryloxypropyltrimethoxysilane and 5 g of lauryl mercaptan, was dropwise added from the dropping funnel over a period of 5 hours, and polymerization was carried out at 75° C.

After completion of the dropwise addition, 0.8 g of ADVN was dissolved in 2 g of isopropyl alcohol and added thereto. The mixture was aged at 80° C. for 3 hours and then cooled, whereupon 20 g of 25% aqueous ammonia, 800 g of deionized water and 400 g of isopropyl alcohol were added to obtain a water-soluble resin B-1 having siloxane bonds.

The obtained water-soluble resin B-1 was a transparent aqueous solution having a non-volatile component of 20.1%, a pH of 8.0 and a viscosity of 100 cP.

Blending and Aging

Into a four-necked flask having an internal capacity of 2 l, equipped with a stirrer, a temperature regulator, a thermometer, a reflux condenser and a dropping funnel, 1,000 g of the water-soluble resin B-1 prepared as described above and 50 g of deionized water, were charged, and the temperature was raised, whereupon 50 g of MKC silicate MS51 (manufactured by Mitsubishi Chemical Corporation) as a siloxane compound, was gradually dropwise added over a period of 30 minutes at an internal temperature of 60° C. by means of the dropping funnel, with stirring. Further, aging was carried out at the same temperature for 5 hours with stirring. Then, the mixture was cooled to obtain a water-soluble resin composition B-2.

This water-soluble resin composition B-2 was a transparent aqueous solution having a non-volatile content of 20.5%, a pH of 8.0 and a viscosity of 200 cP.

Removal of the Solvent

Into a four-necked flask having an internal capacity of 2 l, equipped with a stirrer, a temperature regulator, a thermometer, a reflux condenser or a rectifier and a dropping funnel, 1,000 g of the water-soluble resin composition B-2 prepared as described above, was charged, and the temperature was raised, whereupon isopropyl alcohol was removed out of the system under reduced pressure for 5 hours while azeotropically distilling at an internal temperature of 90° C., and 850 g was taken out. Further, 850 g of deionized water was gradually dropwise added over a period of 30 minutes with stirring, and complete water-solubilization was carried out at the same temperature for 2 hours with stirring. Then, the mixture was cooled to obtain a water-soluble resin composition B-3.

This water-soluble resin composition B-3 was a transparent aqueous solution containing 0.3% of isopropyl alcohol and having a non-volatile content of 21.2%, a pH of 8.0 and a viscosity of 5,000 cP.

The isopropyl alcohol was measured by gas chromatography.

EXAMPLE 3

Preparation of Water-soluble Resin Having Siloxane Bonds

Into a four-necked flask having an internal capacity of 2 l, equipped with a stirrer, a temperature regulator, a thermometer, a reflux condenser, a dropping funnel and a nitrogen gas supply tube, 400 g of butyl cellosolve was charged, and the temperature was raised to 75° C. while introducing nitrogen gas. Then, 1.6 g of AIBN was added, and then a monomer mixture obtained by stirring and mixing 20 g of butyl acrylate, 180 g of methyl methacrylate, 80 g of acrylic acid, 120 g of 3-acryloxypropyltrimethoxysilane and 8 g of lauryl mercaptan, was dropwise added from the dropping funnel over a period of 5 hours, and polymerization was carried out at 750° C. After completion of the dropwise addition, 0.8 g of ADVN was dissolved in 2 g of butyl cellosolve and added thereto. The mixture was aged at 80° C. for 3 hours and then cooled, whereupon 20 g of 25% aqueous ammonia and 400 g of deionized water were added to obtain a water-soluble resin C-1 having siloxane bonds.

The obtained water-soluble resin C-1 was a transparent aqueous solution having a non-volatile content of 33.1%, a pH of 8.0 and a viscosity of 3,000 cP.
Blending and Aging Into a four-necked flask having an internal capacity of 2 l, equipped with a stirrer, a temperature regulator, a thermometer, a reflux condenser and a dropping funnel, 1,000 g of the water-soluble resin B-1 prepared as described above, and 330 g of deionized water were charged, and the temperature was raised, whereupon 330 g of MKC silicate MS51 (manufactured by Mitsubishi Chemical Corporation) as a siloxane compound, was gradually dropwise added for 30 minutes by means of the dropping funnel at an internal temperature of 60° C. Further, aging was carried out at the same temperature for 5 hours with stirring. Then, the mixture was cooled to obtain a water-soluble resin composition C-2.

This water-soluble resin composition C-2 was a transparent aqueous solution having a non-volatile content of 33.5%, a pH of 8.0 and a viscosity of 6,000 cP.

EXAMPLE 4

Preparation of Water-soluble Resin Having Siloxane Bonds

Into a four-necked flask having an internal capacity of 2 l, equipped with a stirrer, a temperature regulator, a thermometer, a reflux condenser, a dropping funnel and a nitrogen gas supply tube, 400 g of isopropyl alcohol was charged, and the temperature was raised to 75° C. while introducing nitrogen gas. Then, 1.6 g of AIBN was added thereto, and then a monomer mixture obtained by stirring and mixing 100 g of 2-ethylhexyl acrylate, 200 g of methyl methacrylate, 60 g of dimethylaminoethyl methacrylate and 40 g of 3-methacryloxypropyl trimethoxysilane, was dropwise added over a period of 5 hours from the dropping funnel, and polymerization was carried out at 75° C. After completion of the dropwise addition, 0.8 g of ADVN was dissolved in 2 g of isopropyl alcohol and added thereto. The mixture was aged at 80° C. for 3 hours and then cooled, whereupon 10 g of acetic acid and 400 g of deionized water were added thereto to obtain a water-soluble resin D-1 having siloxane bonds.

The obtained water-soluble resin D-1 was a transparent aqueous solution having a non-volatile content of 33.1%, a pH of 6.0 and a viscosity of 1,800 cP.
Blending and Aging Into a four-necked flask having an internal capacity of 2 l, equipped with a stirrer, a temperature regulator, a thermometer, a reflux condenser and a dropping funnel, 1,000 g of the water-soluble resin D-1 prepared as described above and 100 g of deionized water were charged, and the temperature was raised, whereupon 100 g of MKC silicate MS56 (polymethoxysiloxane, manufactured by Mitsubishi Chemical Corporation; weight average molecular weight: 1,000 to 1,400) as a siloxane compound, was gradually dropwise added over a period of 30 minutes by means of the dropping funnel at an internal temperature of 60° C. Further, aging was carried out at the same temperature for 5 hours with stirring. Then, the mixture was cooled to obtain a water-soluble resin composition D-2.

This water-soluble resin composition D-2 was a transparent aqueous solution having a non-volatile content of 33.5%, a pH of 8.0 and a viscosity of 3,000 cP.

EXAMPLE 5

Preparation of Water-soluble Resin Having Siloxane Bonds

Into a four-necked flask having an internal capacity of 2 l, equipped with a stirrer, a temperature regulator, a thermometer, a reflux condenser, a dropping funnel and a nitrogen gas supply tube, 400 g of isopropyl alcohol was charged, and the temperature was raised to 75° C. while introducing nitrogen gas. Then, 1.6 g of AIBN was added, and then a monomer mixture obtained by stirring and mixing 40 g of butyl acrylate, 200 g of methyl methacrylate, 160 g of hydroxyethyl methacrylate and 4 g of 3-methacryloxypropyl trimethoxysilane, was dropwise added over a period of 5 hours from the dropping funnel, and polymerization was carried out at 75° C. After completion of the dropwise addition, 0.8 g of ADVN was dissolved in 2 g of isopropyl alcohol, and added thereto. The mixture was aged at 80° C. for 3 hours and then cooled, whereupon 2 g of triethylamine and 400 g of deionized water were added to obtain a water-soluble resin E-1 having siloxane bonds.

The obtained water-soluble resin E-1 was a transparent aqueous solution having a non-volatile content of 33.1%, a pH of 7.0 and a viscosity of 1,000 cP.
Blending and Aging Into a four-necked flask having an internal capacity of 2 l, equipped with a stirrer, a temperature regulator, a thermometer, a reflux condenser and a dropping funnel, 1,000 g of the water-soluble resin E-1 prepared as described above and 30 g of deionized water were charged, and the temperature was raised, whereupon 30 g of MKC silicate MS51 (manufactured by Mitsubishi Chemical Corporation) as a siloxane compound, was gradually dropwise added over a period of 30 minutes with stirring by means of a dropping funnel at an internal temperature of 60° C. Further, aging was carried out at the same temperature for 5 hours with stirring. Then, the mixture was cooled to obtain a water-soluble resin composition E-2.

This water-soluble resin composition E-2 was a transparent aqueous solution having a non-volatile content of 33.5%, a pH of 8.0 and a viscosity of 3,000 cP.

Comparative Example 1

A water-soluble resin F-1 having no siloxane bonds, was obtained by carrying out the same operation with the same monomer composition as in Example 1 except that 3-methacryloxypropyl trimethoxysilane (A-174) was omitted in the preparation of the water-soluble resin A-1 in Example 1.

The obtained water-soluble resin F-1 was a transparent aqueous solution having a non-volatile content of 38.5%, a pH of 8.0 and a viscosity of 500 cP.

Comparative Example 2

50 g of MKC silicate MS51 (manufactured by Mitsubishi Chemical Corporation) was dropwise added to 500 g of the water-soluble resin F-1 obtained in Comparative Example 1, at room temperature with stirring, and the temperature was raised to 60° C., and aging was carried out at pH 8.0 with stirring to prepare a water-soluble resin composition F-2, but 30 minutes later, the entire liquid was gelled.

Comparative Example 3

50 g of MKC silicate MS51 (manufactured by Mitsubishi Chemical Corporation) was dropwise added to 500 g of the water-soluble resin A-1 obtained in Example 1, over a period of 30 minutes at room temperature with stirring to obtain a water-soluble resin composition A-4 having no aging operation carried out after blending.

The obtained water-soluble resin A-4 was a transparent aqueous solution having a non-volatile content of 45.2%, a pH of 7.8 and a viscosity of 1,200 cP.

Comparative Example 4

Into a four-necked flask having an internal capacity of 2 l, equipped with a stirrer, a temperature regulator, a thermometer, a reflux condenser, a dropping funnel and a nitrogen gas supply tube, 400 g of isopropyl alcohol was charged, and the temperature was raised to 75° C. while introducing nitrogen gas. Then, 1.6 g of AIBN was added thereto, and a monomer mixture obtained by stirring and mixing 20 g of methyl methacrylate, 60 g of acrylic acid, 320 g of 3-methacryloxypropyl trimethoxysilane and 5 g of lauryl mercaptan, was dropwise added over a period of 5 hours from the dropping funnel, and polymerization was carried out at 75° C.

After completion of the dropwise addition, 0.8 g of ADVN was dissolved in 2 g of isopropyl alcohol and added thereto. Aging was carried out at 80° C. to prepare a water-soluble resin G-1, but upon expiration of 1 hour of aging, the content was gelled, and it was impossible to obtain a water-soluble resin G-1.

EXAMPLE 6

Preparation of Coating Liquids and Evaluation of Clear Coating Films

Water was added to the water-soluble resins and the water-soluble resin compositions obtained in Examples 1 to 5 and Comparative Examples 1 to 3 so that the solid content concentrations would be 20% to obtain coating liquids having a viscosity of not higher than 100 cP.

These coating liquids were stored at 50° C. for 2 weeks, whereby the storage stability was determined by the increase of the viscosity or the state of gelation, and the blend stability at the time of adding MS51 in the preparation of each water-soluble resin composition was evaluated. The results are shown in Table 2.

Further, to improve the water resistance, 10 g of DENACOL EX-521 (polyglycerol polyglycidyl ether) as a water-soluble epoxy resin (manufactured by Nagase Kasei K.K.) was blended to 100 g of each of these coating liquids (Examples 1 to 4 and Comparative Example 1), or 5 g of PAPI135 as a polyisocyanate resin (manufactured by Dow Polyurethane Japan K.K.) was blended to 100 g of the coating liquid of Example 5. Then, using a glass substrate, spray coating was carried out in a coating amount of 100 g/m$^2$, followed by curing at 40° C. for 30 minutes, whereupon the clear coating film was evaluated. The results of evaluation are shown in Table 2.

EXAMPLE 7

Preparation of Coating Materials and Evaluation of Coating Films 10 g of DENACOL EX-521 (polyglycerol polyglycidyl ether) as a water-soluble epoxy resin (manufactured by Nagase Kasei K.K.) and 5 g of Titan Paste SD-7042 (60% aqueous dispersion titanium paste), manufactured by Dainippon Ink K.K., were blended to 100 g of each of the coating liquids of Examples 1 to 4 and Comparative Example 1, to prepare a coating material.

Further, 5 g of PAPI135 as a polyisocyanate resin (manufactured by Dow Polyurethane Japan K.K.) and 5 g of Titan Paste SD-7042 (60% aqueous dispersion titanium paste) manufactured by Dainippon Ink K.K., were blended to the coating liquid of Example 5, followed by stirring to prepare a coating material.

Using a slate plate as a substrate, a chlorinated rubber type sealer (manufactured by Asahi Denka K.K.) was spray-coated at a rate of 100 g/m$^2$ wet and left to stand at room temperature for 2 days, whereupon each coating material prepared as described above was spray-coated at a rate of from 250 to 300 g/m$^2$ wet and cured at 40° C. for 30 minutes to obtain a coating film. The results of evaluation of these coating films are shown in Table 3.

The test methods for evaluation of coating films will be described.

TEST METHOD 1

Warm Water Resistance

A sample was completely dipped in warm water at 60° C. for 10 days, and the appearance upon being withdrawn and the appearance after drying at room temperature, were evaluated by the following standards.

⊚: No peeling observed.

○: Pinhole-like peeling observed.

Δ: Partial peeling observed.

×: Entire peeling observed.

TEST METHOD 2

Solvent Resistance

A paper towel was impregnated adequately with tetrahydrofuran (hereinafter referred to as THF), methyl ethyl ketone (hereinafter referred to as MEK) or methanol, and the coating film of a test specimen was rubbed 50 times, whereupon the surface state was inspected and evaluated by the following evaluation standards.

⊚: No whitening or blister observed.
○: Slight whitening observed.
Δ: Both whitening and blister observed.
×: The coating film dissolved.

TEST METHOD 3

Pencil Hardness

With pencils having various degrees of hardness, lines were drawn at an angle of 45° on the coated film of a test specimen, and then the lines were erased with a eraser, whereby the hardness of a pencil whereby a scratch mark which can not be erased, will not remain on the coated surface, was taken as the hardness of the coating film.

TEST METHOD 4

Initial Gloss of Coating Film

A plate coated with each coating material was measured by a gloss meter (incident angle: 60°, reflection angle: 60°).

TEST METHOD 5

Gloss Ratio of Coating Film

A plate coated with each coating material was subjected to ultraviolet irradiation by a sunshine weather-ometer for 2,000 hours, whereupon the gloss of the test specimen was measured by a gloss meter (incident angle: 60°, reflection angle: 60°), and the percentage of the gloss relative to the initial gloss was determined. TEST METHOD 6 (Color difference of coating film)

A plate coated with each coating material was subjected to ultraviolet irradiation by a sunshine weather-ometer for 2,000 hours, and the color of the test specimen was measured by a color difference meter, and the color difference from the initial color was determined.

TEST METHOD 7

Antifouling Property

A plate coated with each coating material was left on an outdoor exposure stand for one year at an angle of 45° facing south, whereupon the degree of antifouling property was evaluated by the following evaluation standards.

⊚: No substantial fouling observed on the coating film surface even without washing with water.
○: Fouling on the coating film surface was removed by gently washing with water.
Δ: Fouling on the coating film surface was removed by intensive washing with water.
×: Fouling on the coating film surface was not removed by washing with water.

Sunshine weather-ometer: Ci35 xenon lamp type weather-ometer, manufactured by Toyo Seiki Seisakusho K.K.
Gloss meter: UGV-50D Model digital angle-changing gloss meter, manufactured by Suga Shikenki K.K.
Color difference meter: CR-300 color difference meter, manufactured by Minolta Camera K.K.

TABLE 1

50° C. storage stability of coating liquid and MS51 blend stability

| Water-soluble resin and water-soluble resin composition | MS51 blend stability in the preparation of water-soluble resin composition | Storage stability of coating liquid at 50° C. for 2 weeks |
|---|---|---|
| Water-soluble resin A-1 | — | ○ |
| Water-soluble resin composition A-2 | Good | ○ |
| Water-soluble resin B-1 | — | ○ |
| Water-soluble resin composition B-2 | Good | ○ |
| Water-soluble resin C-1 | — | ○ |
| Water-soluble resin composition C-2 | Good | ○ |
| Water-soluble resin D-1 | — | ○ |
| Water-soluble resin composition D-2 | Good | ○ |
| Water-soluble resin E-1 | — | ○ |
| Water-soluble resin composition E-2 | Good | ○ |
| Water-soluble resin F-1 | — | ○ |
| Water-soluble resin composition F-2 | Gelation | — |
| Water-soluble resin composition A-4 | Good | Gelation |

TABLE 2

Results of evaluation of clear coating films of coating liquids

| Water-soluble resin and water-soluble resin composition | Coating film properties | | | | |
|---|---|---|---|---|---|
| | Pencil hardness | Warm water resistance (60° C.) | Solvent resistance | | |
| | | | Methanol | MEK | THF |
| Water-soluble resin A-1 | 3H | ○ | Δ | Δ | × |
| Water-soluble resin composition A-2 | 5H | ○ | ⊚ | ⊚ | ⊚ |
| Water-soluble resin B-1 | 2–3H | ○ | Δ | × | × |
| Water-soluble resin composition B-2 | 4H | ○ | ⊚ | ⊚ | ⊚ |
| Water-soluble resin C-1 | 2H | ○ | Δ | Δ | Δ |
| Water-soluble resin composition C-2 | 7H | ○ | ⊚ | ⊚ | ⊚ |
| Water-soluble resin D-1 | 2–3H | ○ | Δ | × | × |
| Water-soluble resin composition D-2 | 5H | ○ | ⊚ | ⊚ | ○ |
| Water-soluble resin E-1 | 3H | × | Δ | Δ | Δ |
| Water-soluble resin composition E-2 | 4H | ○ | ⊚ | ⊚ | ○ |
| Water-soluble resin F-1 | 2–3H | Whitening | × | × | × |
| Water-soluble resin composition F-2 | Not testable | Not testable | Not testable | | |
| Water-soluble resin | Not | Not | Not testable | | |

TABLE 2-continued

Results of evaluation of clear coating films of coating liquids

| Water-soluble resin and water-soluble resin composition | Coating film properties | | | | |
|---|---|---|---|---|---|
| | Pencil hardness | Warm water resistance (60° C.) | Solvent resistance | | |
| | | | Methanol | MEK | THF |
| composition A-4 | testable | testable | | | |

Each coating liquid was adjusted to a solid content of 20% (viscosity: not higher than 100 cp) by an addition of water, and then formed into a coating film.

TABLE 3

Results of evaluation of the coating films of coating liquids

| Water-soluble resin and water-soluble resin composition | Coating film properties | | | | |
|---|---|---|---|---|---|
| | Pencil hardness | Sunshine weather-ometer (2000 hr) | | | Anti-fouling property |
| | | Initial gloss | Gloss maintaining ratio | Color difference | |
| Water-soluble resin A-1 | 3H | 91 | 50 | 5 | Δ |
| Water-soluble resin composition A-2 | 5H | 85 | 85 | 2 | ⊚ |
| Water-soluble resin B-1 | 2–3H | 90 | 40 | 7 | Δ |
| Water-soluble resin composition B-2 | 5H | 88 | 87 | 1.5 | ⊚ |
| Water-soluble resin C-1 | 3H | 91 | 50 | 5 | Δ |
| Water-soluble resin composition C-2 | 7H | 79 | 85 | 1 | ⊚ |
| Water-soluble resin D-1 | 3H | 84 | 20 | 8 | x |
| Water-soluble resin composition D-2 | 5H | 81 | 79 | 5 | ⊚ |
| Water-soluble resin E-1 | 3H | 91 | 40 | 4 | ○ |
| Water-soluble resin composition E-2 | 4–5H | 85 | 75 | 3 | ⊚ |
| Water-soluble resin F-1 | 2–3H | 90 | 10 | 10 | x |

EXAMPLE 8

Preparation of Water-dispersible Resin a-1

Into a four-necked flask having an internal capacity of 2 l, equipped with a stirrer, a temperature regulator, a thermometer, a reflux condenser, a dropping funnel and a nitrogen gas supply tube, 500 g of deionized water and 2.5 g of "AKUARON HS-10" (reactive anionic surfactant, manufactured by Daiichi Kogyo Seiyaku K.K.) were charged, and the temperature was raised to 80° C. while introducing nitrogen gas. Then, 2.5 g of 2,2'-azobisisobutyronitrile was added thereto, followed by stirring for 5 minutes. On the other hand, a monomer emulsion prepared by emulsifying 287.5 g of methyl methacrylate, 147.5 g of butyl acrylate, 15 g of methacrylic acid, 15 g of "A-174" (3-methacryloxypropyl trimethoxysilane, manufactured by Nippon Unicar K.K.), 20 g of "AKUARON HS-10" and 180 g of deionized water by a homomixer, was dropwise added over a period of 3 hours from the dropping funnel, and polymerization was carried out at 80° C.

After completion of the dropwise addition, 1 g of 2,2'-azobisdimethylvaleronitrile was added thereto, and the mixture was aged for 3 hours and the cooled, whereupon 3.5 g of 25% aqueous ammonia was added to obtain a water-dispersible resin a-1 having siloxane bonds.

The obtained water-dispersible resin a-1 was a milky white liquid having a non-volatile content of 33.4%, a pH of 8.8 and a viscosity of 19.0 mPa·S.

Preparation of Aqueous Resin Composition A-1; Blending and Aging

Into a four-necked flask having an internal capacity of 2 l, equipped with a stirrer, a temperature regulator, a thermometer, a reflux condenser and a dropping funnel, 1,000 g of the water-dispersible resin a-1 prepared as described above, was charged, and the temperature was raised, whereupon 10 g of "MKC silicate MS51" (polymethoxypolysiloxane, manufactured by Mitsubishi Chemical Corporation; weight average molecular weight: 500 to 800) was gradually dropwise added over a period of 30 minutes with stirring by means of the dropping funnel at an internal temperature of 80° C. Further, aging was carried out for 5 hours with stirring at the same temperature, and then, the mixture was cooled to obtain an aqueous resin composition A-1.

This aqueous resin composition A-1 was a milky white liquid having a non-volatile content of 33.1%, a pH of 8.0 and a viscosity of 240.0 mPa·S.

Preparation of Aqueous Resin Composition A-2; Blending and Aging

Into a four-necked flask having an internal capacity of 2 l, equipped with a stirrer, a temperature regulator, a thermometer, a reflux condenser and a dropping funnel, 1,000 g of the above-mentioned water-dispersible resin a-1 was charged, and the temperature was raised, whereupon 50 g of a siloxane compound "MKC silicate MS51" was gradually dropwise added over a period of 30 minutes with stirring by means of the dropping funnel at an internal temperature of 80° C. Further, aging was carried out for 5 hours with stirring at the same temperature, and then, the mixture Was cooled to obtain an aqueous resin composition A-2.

This aqueous resin composition A-2 was a milky white liquid having a non-volatile content of 33.1%, a pH of 8.1 and a viscosity of 30.5 mPa·S.

Preparation of Aqueous Resin Composition A-3: Blending and Aging

Into a four-necked flask having an internal capacity of 2 l, equipped with a stirrer, a temperature regulator, a thermometer, a reflux condenser and a dropping funnel, 1,000 g of the water-dispersible resin a-1 prepared as described above, was charged, and the temperature was raised, whereupon 100 g of a siloxane compound "MKC silicate MS51" was gradually dropwise added over a period of 30 minutes with stirring by means of the dropping funnel at an internal temperature of 80° C. Further, aging was carried out for 5 hours with stirring at the same temperature, and then, the mixture was cooled to obtain an aqueous resin composition A-3.

This aqueous resin composition A-3 was a milky white liquid having a non-volatile content of 36.4%, a pH of 8.1 and a viscosity of 39.0 mPa·S.

EXAMPLE 9

Preparation of Water-dispersible Resin a-4

Into a four-necked flask having an internal capacity of 2 l, equipped with a stirrer, a temperature regulator, a thermometer, a reflux condenser, a dropping funnel and a nitrogen gas supply tube, 500 g of deionized water and 2.5 g of "AKUARON HS-10" were charged, and the temperature was raised to 80° C. while introducing nitrogen gas. Then, 2.5 g of 2,2'-azobisisobutyronitrile was added thereto, followed by stirring for 5 minutes. On the other hand, a monomer emulsion prepared by emulsifying 287.5 g of methyl methacrylate, 147.5 g of butyl acrylate, 15 g of meuhacrylic acid, 15 g of "Y-9936" (3-methacryloxypropyl triethoxysilane, manufactured by Nippon Unicar K.K., 20 g of "AKUARON HS-10" and 180 g of deionized water by a homomixer was dropwise added over a period of 3 hours by the dropping funnel, and the polymerization was carried out at 80° C.

After completion of the dropwise addition, 1 g of 2,2'-azobisisovaleronitrile was added thereto, and the mixture was aged for 3 hours and then cooled, whereupon 3.5 g of 25% aqueous ammonia and water in an amount to bring the non-volatile content to a level equal to the water-dispersible resin a-1 of Example 8, were added to obtain a water-dispersible resin a-4 having siloxane bonds.

The obtained water-dispersible resin a-4 was a milky white liquid having a non-volatile content of 33.1%, a pH of 8.6 and a viscosity of 19.0 mPa·S.

Preparation of Aqueous Resin Composition A-4: Blending and Aging

Into a four-necked flask having an internal capacity of 2 l, equipped with a stirrer, a temperature regulator, a thermometer, a reflux condenser and a dropping funnel, 1,000 g of the above water-dispersible resin a-4 was charged, and the temperature was raised, whereupon 50 g of a siloxane compound "MKC silicate MS51" was gradually dropwise added over a period of 30 minutes with stirring by means of the dropping funnel at an internal temperature of 80° C. Further, aging was carried out for 5 hours with stirring at the same temperature, and then, the mixture was cooled to obtain an aqueous resin composition A-4.

This aqueous resin composition A-4 was a milky white liquid having a non-volatile content of 32.7%, a pH of 8.2 and a viscosity of 27.0 cP.

EXAMPLE 10

Preparation of Water-dispersible Resin a-5

Into a four-necked flask having an internal capacity of 2 l, equipped with a stirrer, a temperature regulator, a thermometer, a reflux condenser, a dropping funnel and a nitrogen gas supply tube, 500 g of deionized water and 2.5 g of "AKUARON HS-10" were charged, and the temperature was raised to 80° C. while introducing nitrogen gas. Then, 2.5 g of 2,2'-azobisisobutyronitrile was added thereto, followed by stirring for 5 minutes. On the other hand, a monomer emulsion prepared by emulsifying 287.5 g of methyl methacrylate, 147.5 g of butyl acrylate, 15 g of methacrylic acid, 15 g of "Y-9910" (3-methacryloxypropylmethyl dimethoxysilane, manufactured by Nippon Unicar K.K.), 20 g of "AKUARON HS-10" and 180 g of deionized water by a homomixer, was dropwise added over a period of 3 hours by the dropping funnel, and polymerization was carried out at 80° C.

After completion of the dropwise addition, 1 g of 2,2'-azobisisovaleronitrile was added thereto, and the mixture was aged for 3 hours and then cooled, whereupon 3.5 g of 25% aqueous ammonia, and water in an amount to bring the non-volatile content to a level equal to the water-dispersible resin a-1 of Example 8, were added to obtain a water-dispersible resin a-5 having siloxane bonds.

The obtained water-dispersible resin a-5 was a milky white liquid having a non-volatile content of 33.0%, a pH of 8.7 and a viscosity of 15.5 mPa·S.

Preparation of Aqueous Resin Composition A-5; Blending and Aging

Into a four-necked flask having an internal capacity of 2 l, equipped with a stirrer, a temperature regulator, a thermometer, a reflux condenser and a dropping funnel, 1,000 g of the water-dispersible resin a-5 prepared as described above, was charged, and the temperature was raised, whereupon 50 g of a siloxane compound "MKC silicate MS51" was gradually dropwise added over a period of 30 minutes with stirring by means of the dropping funnel at an internal temperature of 80° C. Further, aging was carried out for 5 hours with stirring at the same temperature, and then, the mixture was cooled to obtain an aqueous resin composition A-5.

This aqueous resin composition A-5 was a milky white liquid having a non-volatile content of 32.6%, a pH of 8.3 and a viscosity of 21.5 mPa·S.

EXAMPLE 11

Preparation of Water-dispersible Resin a-6

Into a four-necked flask having an internal capacity of 2 l, equipped with a stirrer, a temperature regulator, a thermometer, a reflux condenser, a dropping funnel and a nitrogen gas supply tube, 500 g of deionized water and 2.5 g of "AKUARON HS-10" were charged, and the temperature was raised to 80° C. while introducing nitrogen gas. Then, 2.5 g of 2,2'-azobisisobutyronitrile was added thereto, followed by stirring for 5 minutes. On the other hand, a monomer emulsion prepared by emulsifying 287.5 g of methyl methacrylate, 147.5 g of butyl acrylate, 15 g of methacrylic acid, 50 g of 3-methacryloxypropyl trimethoxysilane, 20 g of "AKUARON HS-10" and 180 g of deionized water by a homomixer, was dropwise added over a period of 3 hours from the dropping funnel, and polymerization was carried out at 80° C.

After completion of the dropwise addition, the mixture was aged for 3 hours and then cooled, whereupon water was added to bring the non-volatile content to a level equal to the water-dispersible resin a-1 of Example 8, to obtain a water-dispersible resin a-6.

The obtained water-dispersible resin a-6 was a milky white liquid having a non-volatile content of 33.8%, a pH of 8.6 and a viscosity of 18.0 mPa·S.

Preparation of Aqueous Resin Composition A-6; Blending and Aging

Into a four-necked flask having an internal capacity of 2 l, equipped with a stirrer, a temperature regulator, a thermometer, a reflux condenser and a dropping funnel, 1,000 g of the water-dispersible resin a-6 prepared as described above, was charged, and the temperature was raised, whereupon 50 g of a siloxane compound "MKC silicate MS51" was gradually dropwise added over a period of 30 minutes with stirring by means of the dropping funnel at an internal temperature of 80° C. Further, aging was carried out for 5 hours with stirring at the same temperature, and then, the mixture was cooled to obtain an aqueous resin composition A-6.

This aqueous resin composition A-6 was a milky white liquid having a non-volatile content of 32.4%, a pH of 82 and a viscosity of 35.0 mPa·S.

Comparative Example 5

Preparation of Water-dispersible Resin b-1

Into a four-necked flask having an internal capacity of 2 l, equipped with a stirrer, a temperature regulator, a thermometer, a reflux condenser, a dropping funnel and a nitrogen gas supply tube, 500 g of deionized water and 2.5 g of "AKUAPON HS-10" were charged, and the temperature was raised to 80° C. while introducing nizrogen gas. Then, 2.5 g of 2,2'-azobisisobutyronitrile was added thereto, followed by stirring for 5 minutes. On the other hand, a monomer emulsion prepared by emulsifying 287.5 g of methyl methacrylate, 147.5 g of butyl acrylate, 15 g of methacrylic acid, 20 g of "AKUARON HS-10" and 180 g of deionized water by a homomixer, was dropwise added over a period of 3 hours from the dropping funnel, and polymerization was carried out at 80° C.

After completion of the dropwise addition, 1 g of 2,2'-azobisisovaleronitrile was added thereto, and the mixture was aged for 3 hours and then cooled, whereupon 3.5 g of 25% aqueous ammonia and water in an amount to bring the non-volatile content to a level equal to the water-dispersible resin a-1 of Example 8, were added to obtain a water-dispersible resin b-1.

The obtained water-dispersible resin b-1 was a milky white liquid having a non-volatile content of 32.6%, a pH of 8.6 and a viscosity of 22.5 mPa·S.

Preparation of Aqueous Resin Composition B-1; Blending and Aging

Into a four-necked flask having an internal capacity of 2 l, equipped with a stirrer, a temperature regulator, a thermometer, a reflux condenser and a dropping funnel, 1,000 g of the water-dispersible resin b-1 prepared as described above, was charged, and the temperature was raised, whereupon 30 g of a siloxane compound "MKC silicate MS51" was gradually dropwise added over a period of 30 minutes with stirring by means of the dropping funnel at an internal temperature of 80° C. Further, aging was carried out for 5 hours with stirring at the same temperature to obtain an aqueous resin composition B-1. However, a large amount of precipitates formed.

Comparative Example 6

Preparation of Water-dispersible Resin b-2

Into a four-necked flask having an internal capacity of 2 l, equipped with a stirrer, a temperature regulator, a thermometer, a reflux condenser, a dropping funnel and a nitrogen gas supply tube, 500 g of deionized water and 2.5 g of "AKUARON HS-10" were charged, and the temperature was raised to 80° C. while introducing nitrogen gas.

Then, 2.5 g of 2,2'-azobisisobutyronitrile was added thereto, followed by stirring for 5 minutes. On the other hand, a monomer emulsion prepared by emulsifying 287.5 g of methyl methacrylate, 147.5 g of butyl acrylate, 15 g of methacrylic acid, 15 g of 3-methacryloxypropyl trimethoxysilane, 20 g of "AKUARON HS-10" and 180 g of deionized water by a homomixer, was dropwise added over a period of 3 hours from the dropping funnel, and polymerization was carried out at 80° C.

After completion of the dropwise addition, the mixture was aged for 3 hours and then cooled, to obtain a water-dispersible resin b-2.

The obtained water-dispersible resin b-2 was a milky white liquid having a non-volatile content of 31.8%, a pH of 3.5 and a viscosity of 45.0 mPa·S.

Preparation of Aqueous Resin Composition B-2; Blending and Aging

Into a four-necked flask having an internal capacity of 2 l, equipped with a stirrer, a temperature regulator, a thermometer, a reflux condenser and a dropping funnel, 1,000 g of the water-dispersible resin b-2 prepared as described above, was charged, and the temperature was raised, whereupon 30 g of a siloxane compound "MKC silicate MS51" was gradually dropwise added over a period of 30 minutes with stirring by means of the dropping funnel at an internal temperature of 80° C. Further, aging was attempted for 5 hours with stirring at the same temperature, but this aqueous resin composition B-2 underwent gelation.

Comparative Example 7

Blending and Aging of Aqueous Resin Composition B-3

Into a four-necked flask having an internal capacity of 2 l, equipped with a stirrer, a temperature regulator, a thermometer, a reflux condenser and a dropping funnel, 1,000 g of the water-dispersible resin b-2 prepared as described above, was charged, and the temperature was raised, whereupon 30 g of a siloxane compound "MKC silicate MS51" was gradually dropwise added over a period of 30 minutes with stirring by means of the dropping funnel at an internal temperature of 30 ° C. Further, aging was attempted for 5 hours with stirring at the same temperature, but this aqueous resin composition B-3 underwent gelation.

The types and the amounts of the silane coupling agents used for preparation of the water-dispersible resins, and the amounts of the siloxane compounds used or the preparation of the aqueous resin compositions in Examples 8 to 11 and Comparative Examples 5 to 7, are summarized in Table 4.

Conditions for Preparation of Coating Films, Test Methods and Results

Stability of Coating Liquids

Water Was optionally added to the aqueous resin composition obtained in each Example or Comparative Example to bring the solid content in the composition to 20%, to obtain a coating liquid having a viscosity of not higher than 100 cp.

These coating liquids were stored at 50° C. for 2 weeks to determine the storage stability, and the "MS-51" blend stability was evaluated on the basis of viscosity increase or gelation, and the results are shown in Table 5.

◯: No change observed.

Δ: Viscosity increase observed.

×: Coagulation or gelation observed.

Pencil Hardness Test

The aqueous resin composition of each Example or Comparative Examples was adjusted by adding a proper amount of water to bring the non-volatile content to 30% and then coated on a glass plate by means of an applicator or 0.2 mm and dried at 25° C. for 3 hours, 24 hours and 72 hours, whereupon the clear coating film was subjected to measurement of the pencil hardness of the coating film in accordance with the method disclosed in JIS K5400. The results are shown in Table 6.

Water Resistance Test

The aqueous resin composition of each Example or Comparative Example was coated on a Teflon sheet in an amount of 200 g/m² and dried at 80° C. for 24 hours, and the clear coating film thereby formed was immersed in water at room temperature for 24 hours, whereupon the water absorptivity of the coating film was measured. The results are shown in Table 6.

Warm Water Resistance Test

The aqueous resin composition of each Example or Comparative Example was adjusted by adding a proper amount of water to bring the non-volatile content to 30% and then coated on a glass plate by means of an applicator of 0.2 mm and dried, and the clear coating film thereby obtained was immersed in warm water of 50° C. 24 hours, whereby the appearance of the coating film was observed. The results are shown in Table 6.

○: No change observed.
Δ: Slight whitening observed.
×: Whitening observed.

MEK Resistance Test

The same coating film as for the warm water resistance test was prepared and immersed in methyl ethyl ketone at room temperature for 24 hours, whereby the appearance of the coating film was observed. The result is shown as "MEK resistance" in Table 6.

⊚: No change observed.
○: Slightly swelled.
Δ: Swelled.
×: Dissolved.

Preparation of Coating Materials and Evaluation of Coating Films

The aqueous resin compositions obtained in Examples 8 to 11 and Comparative Example 5 to 7 were formed into aqueous white coating materials by the following blend formulation.

| | |
|---|---|
| Titanium oxide (JR-600E manufactured by Teika K.K. | 30 parts |
| Dispersant (Quinflow 540, manufactured by Kao Corporation | 0.3 part |
| Thickener (SP-600 2% aqueous solution, manufactured by Daicel Kagaku K.K.) | 3 parts |
| Plasticizer (Texanol, manufactured by Eastman Chemical Co.) | 2 parts |
| Aqueous resin composition (Examples 8–11, Comparative Examples 5–7) | 100 parts |

Outdoor Exposure Test

The aqueous white coating material prepared by the above formulation was coated on a SUS plate in an amount of 200 g/m² and dried at 80° C. for 3 hours. With respect to the initial coating film and the coating film after subjecting to an exposure test for 6 months from March to September under a condition of 45° facing south outdoors in Hirakata City, Osaka, Japan, the L-value represented by a L,a,b color system was measured by a color difference meter CR-300 (manufactured by Minolta Camera K.K.) Further, the gloss retention at a 60° specular gloss was measured by a digital angle-changeable gloss meter UGV-5DP (manufactured by Suga Shikenki K.K.).

The results are showm in Table 7.

Accelerated Weather Resistance Test

The same coated plate as for the outdoor exposure test, was prepared, and with respect to the initial coating film, and the coating film after irradiation for 1,000 hours or 2,000 hours by means of a UVCON accelerated weather resistance tester (manufactured by Atlas Co.), the E value represented by a L,a,b color system was measured by a color difference meter CR-300 (manufactured by Minolta Camera K.K.). Further, the gloss retention at a 60° specular gloss was measured by a digital angle-changeable gloss meter UGV-5DP (manufactured by Suga Shikenki K.K.). The results are shown in Table 7.

TABLE 4

Types and amounts of silane coupling agents used for preparation of water-dispersible resins, and amounts of siloxane compounds used for preparation of aqueous resin compositions

| Water-dispersible resin and aqueous resin composition | Silane coupling agent Type/amount (against monomers) | | Amount of MS-51 against resin |
|---|---|---|---|
| Water-dispersible resin a-1 Aqueous resin composition A-1 | A-174 | 3% | 3.3% |
| Water-dispersible resin a-1 Aqueous resin composition A-2 | A-174 | 3% | 16.6% |
| Water-dispersible resin a-1 Aqueous resin composition A-3 | A-174 | 3% | 33.3% |
| Water-dispersible resin a-4 Aqueous resin composition A-4 | Y-9936 | 3% | 16.6% |
| Water-dispersible resin a-5 Aqueous resin composition A-5 | Y-9910 | 3% | 16.6% |
| Water-dispersible resin a-6 Aqueous resin composition A-6 | A-174 | 10% | 16.6% |
| Water-dispersible resin b-1 Aqueous resin composition B-1 | Nil | | 16.6% |
| Water-dispersible resin b-2 Aqueous resin composition B-2 | A-174 | 3% | — |
| Water-dispersible resin b-2 Aqueous resin composition B-3 | A-174 | 3% | — |

The symbol — means "not incorporated".

TABLE 5

50° C. storage stability of coating liquids and MS-51 blend stability

| Water-dispersible resin and aqueous resin composition | MS-51 blend stability of water-dispersible resin composition | Storage stability of coating liquid at 50° C. for 2 weeks |
|---|---|---|
| Water-dispersible resin a-1 | — | ○ |
| Aqueous resin composition A-1 | ○ | ○ |
| Water-dispersible resin a-1 | — | — |
| Aqueous resin composition A-2 | ○ | ○ |
| Water-dispersible resin a-1 | — | — |
| Aqueous resin composition A-3 | ○ | ○ |
| Water-dispersible resin a-4 | — | ○ |
| Aqueous resin composition A-4 | ○ | ○ |
| Water-dispersible resin a-5 | — | ○ |
| Aqueous resin composition A-5 | ○ | ○ |
| Water-dispersible resin a-6 | — | ○ |
| Aqueous resin composition A-6 | ○ | ○ |
| Water-dispersible resin b-1 | — | ○ |
| Aqueous resin composition B-1 | x (precipitates formed) | ○ |
| Water-dispersible resin b-2 | — | — |
| Aqueous resin composition B-2 | x (gelation) | — |
| Water-dispersible resin b-2 | — | — |
| Aqueous resin composition B-3 | x (gelation) | — |

TABLE 6

Clear coating film properties of coating liquids

| Water-dispersible resin and aqueous resin composition | Pencil hardness 3 h | Pencil hardness 24 h | Pencil hardness 72 h | Absorp-tivity (%) | Warm water resist-ance | MEK resist-ance |
|---|---|---|---|---|---|---|
| Water-dispersible resin a-1 | B | HB | 2B | 6.6 | Δ | x |
| Aqueous resin composition A-1 | 2B | B | 2B | 4.9 | ○ | x |
| Water-dispersible resin a-1 | | | | | Δ | |
| Aqueous resin composition A-2 | B | HB | B | 5.0 | ○ | x |
| Water-dispersible resin a-1 | | | | | Δ | |
| Aqueous resin composition A-3 | HB | H | 2H | 4.7 | ○ | Δ |
| Water-dispersible resin a-4 | | | | | Δ | |
| Aqueous resin composition A-4 | 2B | H | H | 4.7 | ○ | Δ |
| Water-dispersible resin a-5 | | | | | Δ | |

TABLE 6-continued

Clear coating film properties of coating liquids

| Water-dispersible resin and aqueous resin composition | Pencil hardness 3 h | Pencil hardness 24 h | Pencil hardness 72 h | Absorp-tivity (%) | Warm water resist-ance | MEK resist-ance |
|---|---|---|---|---|---|---|
| Aqueous resin composition A-5 | 2B | H | H | 5.6 | ○ | Δ |
| Water-dispersible resin a-6 | 2B | B | 2B | 5.6 | Δ | Δ |
| Aqueous resin composition A-6 | HB | H | H | 3.9 | ○ | |
| Water-dispersible resin b-1 | B | HB | B | 5.1 | Δ | ○ |
| Aqueous resin composition B-1 | | | | | | |
| Water-dispersible resin b-2 | — | — | — | — | — | — |
| Aqueous resin composition B-2 | | | | | | |
| Water-dispersible resin b-2 | — | — | — | — | — | — |
| Aqueous resin composition B-3 | | | | | | |

TABLE 7

Results of evaluation of coating films of white coating liquids

| Water-dispersible resin and aqueous resin composition | Initial gloss | ΔL-value | Outdoor exposure for 6 months Gloss retention (%) | Accelerated sunshine weather resistance Gloss retention (%) 1,000 hr | Accelerated sunshine weather resistance Gloss retention (%) 2,000 hr | ΔE-value 1,000 hr | ΔE-value 2,000 hr |
|---|---|---|---|---|---|---|---|
| Water-dispersible resin a-1 | 80 | 5 | 85 | 80 | 58 | 1.1 | 3.0 |
| Aqueous resin composition A-1 | 80 | 3.8 | 99 | 99 | 80 | 0.6 | 2.0 |
| Water-dispersible resin a-1 | 80 | 5 | 85 | 80 | 58 | 1.1 | 3.0 |
| Aqueous resin composition A-2 | 78 | 3.0 | 100 | 99 | 83 | 0.5 | 1.8 |
| Water-dispersible resin a-1 | 80 | 5 | 85 | 80 | 58 | 1.1 | 3.0 |
| Aqueous resin composition A-3 | 77 | 2.0 | 100 | 99 | 88 | 0.5 | 1.2 |
| Water-dispersible resin a-4 | 83 | 5.3 | 82 | 78 | 59 | 1.2 | 3.2 |
| Aqueous resin composition A-4 | 80 | 2.8 | 99 | 99 | 78 | 0.7 | 1.9 |
| Water-dispersible resin a-5 | 84 | 5.2 | 84 | 76 | 60 | 1.3 | 2.8 |
| Aqueous resin composition A-5 | 79 | 3.0 | 99 | 98 | 76 | 0.8 | 1.7 |
| Water-dispersible resin a-6 | 76 | 4.5 | 89 | 88 | 68 | 0.8 | 2.2 |
| Aqueous resin composition A-6 | 74 | 1.2 | 100 | 99 | 91 | 0.3 | 0.9 |
| Water-dispersible resin b-1 | 82 | 10 | 75 | 68 | 30 | 3.0 | 4.3 |
| Aqueous resin composition B-1 | | | | | | | |

TABLE 7-continued

Results of evaluation of coating films of white coating liquids

| Water-dispersible resin and aqueous resin composition | Coating film properties | | | | | | |
|---|---|---|---|---|---|---|---|
| | | | Outdoor exposure for 6 months | | Accelerated sunshine weather resistance | | |
| | | | | | Gloss | | |
| | Initial gloss | ΔL-value | Gloss retention (%) | Gloss retention (%) 1,000 hr | Gloss retention (%) 2,000 hr | ΔE-value 1,000 hr | ΔE-value 2,000 hr |
| Water-dispersible resin b-2 Aqueous resin composition B-2 | — | — | — | — | — | — | — |
| Water-dispersible resin b-2 Aqueous resin composition B-3 | — | — | — | — | — | — | — |

As described in the foregoing, the water-soluble or water-dispersible resin composition of the present invention, or the coating composition containing it, has extremely good storage stability, as compared with a conventional aqueous resin composition containing hydrolyzable silyl groups or an aqueous resin composition having a silicon compound added to such a conventional aqueous resin composition, and the coating film obtained by curing it, exhibits excellent effects for development of functions such as high hardness, scratch resistance, chemical resistance, antifouling property, weather resistance and heat resistance, and thus it is particularly useful for application to e.g. a coating agent, a coating material or an adhesive.

What is claimed is:

1. A resin composition comprising the following components (1) and (2):
   (1) a water-soluble resin having siloxane bonds and having a weight average molecular weight ranging from 1,000 to 500,000, which resin is obtained by neutralizing a resin having carboxyl or sulfonic acid groups,
   (2) an organosilicon compound represented by the formula (A1):

$$SiO_aX_bY_c \quad (A1)$$

wherein X is a hydrolyzable group, Y is a non-hydrolyzable group, $0 \leq a \leq 1.4$, and $b/(b+c)=0.01$ to $1.0$, provided $2a+b+c=4$, and
   (3) water.

2. The resin composition according to claim 1, wherein the component (1) is a water-soluble resin having a pH of from 2 to 11.

3. The resin composition according to claim 1, wherein, in the organosilicon compound of the component (2), c=0.

4. A resin composition comprising a siloxane component represented by the formula (B1):

$$SiO_{a'}X_{b'}Y_{c'} \quad (B1)$$

wherein X is a hydrolyzable group, Y is a non-hydrolyzable group, $1.4<a'<2$ and $b'/(b'+c')=0.01$ to $1.0$, provided $2a'+b'+c'=4$, and water.

5. The resin composition according to claim 4, wherein the siloxane component is in the form of particulates having an inertia radius of from 20 Å to 200 Å as measured by a small angle X-ray scattering method.

6. A coating composition comprising the resin composition as defined in claim 1 and at least one additive selected from the group consisting of a pigment, a filler, a dispersant, an antiseptic, a fungicide, a plasticizer and a curing agent.

7. A curable resin composition comprising the resin composition as defined in claim 1 and an epoxy resin, a polyisocyanate resin, a melamine resin or a resin having aziridine rings, oxazoline rings or carbodiimide groups, blended thereto.

8. A method for producing a resin composition, which comprises:
   blending and aging the following components (1) and (2) within a pH of from 2 to 11 at a temperature of from 0 to 200° C.:
   (1) a water-soluble resin having siloxane bonds and having a weight average molecular weight ranging from 1,000 to 500,000, which resin is obtained by neutralizing a resin having carboxyl or sulfonic acid groups, and
   (2) an organosilicon compound represented by the formula (A1):

$$SiO_aX_bY_c \quad (A1)$$

wherein X is a hydrolyzable group, Y is a non-hydrolyzable group, $0 \leq a \leq 1.4$, and $b/(b+c)=0.01$ to $1.0$, provided $2a+b+c=4$.

9. The method for producing a resin composition according to claim 8, wherein an organic solvent is present at the time of blending the components (1) and (2), and the blending and aging are carried out within a temperature range of from 0 to 200° C.

10. A resin composition comprising the following components (1') and (2'):
    (1') a water-dispersible resin having hydrolyzable silyl groups and having a weight average molecular weight ranging from 5,000 to 1 million, which resin is obtained by neutralizing a resin having carboxyl or sulfonic acid groups,
    (2') an organosilicon compound represented by formula (B2):

$$SiO_{a'}X_{b'} \quad (B1)$$

wherein X is a hydrolyzable group, $1.4<a'<2$, provided $2a'+b'=4$, and (3') water.

11. The resin composition according to claim 10, wherein the component (1') is a water-dispersible resin having a pH of from 6 to 12.

12. A coating composition comprising the resin composition as defined in claim 10 and a powder dispersed in the resin composition.

13. A curable resin composition comprising the resin composition as defined in claim 10 and at least one member selected from the group consisting of an epoxy resin, a polyisocyanate resin, a melamine resin and a resin having at least one type of rings selected from the group consisting of aziridine rings, oxazoline rings and carbodiimide groups, blended thereto.

14. A method for producing a resin composition, which comprises:
    blending and aging the following components (1') and (2') within a pH of from 6 to 12 at a temperature of from 0 to 200° C.:

(1') a water-dispersible resin having hydrolyzable silyl groups and having a weight average molecular weight ranging from 5,000 to 1 million, which resin is obtained by neutralizing a resin having carboxyl or sulfonic acid groups, and (2') an organosilicon compound represented by the formula (A2):

$$SiO_aX_b \quad (A2)$$

wherein X is a hydrolyzable group, $0<a<2$, provided $2a+b=4$.

15. The method for producing a resin composition according to claim 14, wherein an organic solvent is present at the time of blending the components (1') and (2'), and the blending and aging are carried out within a temperature range of from 0 to 200° C.

16. A coated product obtained by coating the coating composition as defined in claim 6.

17. A coated product obtained by coating the coating composition as defined in claim 12.

* * * * *